US011203349B2

United States Patent
Kato et al.

(10) Patent No.: US 11,203,349 B2
(45) Date of Patent: Dec. 21, 2021

(54) VELOCITY CALCULATION APPARATUS, CONTROL METHOD, PROGRAM AND STORAGE MEDIUM

(71) Applicant: Pioneer Corporation, Tokyo (JP)

(72) Inventors: Masahiro Kato, Saitama (JP); Ryoko Niihara, Saitama (JP)

(73) Assignee: Pioneer Corporation, Tokyo (JP)

( * ) Notice: Subject to any disclaimer, the term of this patent is extended or adjusted under 35 U.S.C. 154(b) by 275 days.

(21) Appl. No.: 16/330,038

(22) PCT Filed: Sep. 2, 2016

(86) PCT No.: PCT/JP2016/075840
§ 371 (c)(1),
(2) Date: Mar. 1, 2019

(87) PCT Pub. No.: WO2018/042628
PCT Pub. Date: Mar. 8, 2018

(65) Prior Publication Data
US 2019/0202465 A1     Jul. 4, 2019

(51) Int. Cl.
*B60W 40/105*     (2012.01)
*G01S 17/58*     (2006.01)
(Continued)

(52) U.S. Cl.
CPC .......... *B60W 40/105* (2013.01); *B60L 3/00* (2013.01); *G01P 3/42* (2013.01); *G01P 3/50* (2013.01); *G01S 17/58* (2013.01)

(58) Field of Classification Search
CPC ........... B60W 40/105; B60L 3/00; B60L 3/10; G01S 17/50; G01S 17/58; G01P 3/00; G01P 3/42; G01P 3/50
See application file for complete search history.

(56) References Cited

U.S. PATENT DOCUMENTS 3,856,403 A * 12/1974 Maughmer ............. G01P 3/366
356/28
5,321,407 A * 6/1994 Kikuchi ................. G01S 17/931
342/70
(Continued)

FOREIGN PATENT DOCUMENTS

EP     2889641 A1     7/2015
JP     H03-195973 A     8/1991
(Continued)

OTHER PUBLICATIONS

Uradzinski et al., 'Towards Precise Car Navigation: Detection of Relative Vehicle Position on Highway for Collision Avoidance,' 2010, IEEE Publication, pp. 1-8. (Year: 2010).*
(Continued)

*Primary Examiner* — Elias Desta
(74) *Attorney, Agent, or Firm* — Procopio, Cory, Hargreaves & Savitch LLP

(57) ABSTRACT

If a controller determines the calculation of a measured vehicle body velocity is possible, the controller calculates the measured vehicle body velocity as an estimated vehicle body velocity to conduct update processing for a K table and an AB table. If the controller determines the calculation of the measured vehicle body velocity is impossible, the controller extracts a conversion coefficient from the K table based on a detected running state while extracting a sensitivity coefficient and an offset coefficient from the AB table based on the temperature by a temperature sensor. The vehicle mounted apparatus calculates an axle pulse-based vehicle body velocity from the extracted conversion coefficient while calculating an acceleration-based vehicle body velocity from the extracted sensitivity coefficient and offset coefficient. The vehicle mounted apparatus calculates the estimated vehicle body velocity by weighting the calculation (Continued)

values of the axle pulse-based vehicle body velocity and the acceleration-based vehicle body velocity.

11 Claims, 9 Drawing Sheets

(51) Int. Cl.
*G01P 3/42* (2006.01)
*B60L 3/00* (2019.01)
*G01P 3/50* (2006.01)

(56) References Cited

U.S. PATENT DOCUMENTS

| | | | |
|---|---|---|---|
| 5,583,800 A | 12/1996 | Mizukoshi et al. | |
| 6,300,896 B1 | 10/2001 | Kull et al. | |
| 9,308,926 B2 * | 4/2016 | King | B61C 15/12 |
| 10,240,945 B2 * | 3/2019 | Uchida | G01P 21/02 |
| 2002/0072869 A1 | 6/2002 | Stiller | |
| 2013/0338915 A1 | 12/2013 | Mizuochi et al. | |
| 2014/0121954 A1 | 5/2014 | Lee et al. | |
| 2015/0291178 A1 | 10/2015 | You et al. | |

FOREIGN PATENT DOCUMENTS

| | | |
|---|---|---|
| JP | H4244463 A | 9/1992 |
| JP | H06-003448 A | 1/1994 |
| JP | H10104259 A | 4/1998 |
| JP | 2000-074931 A | 3/2000 |
| JP | 2000097968 A | 4/2000 |
| JP | 2000-177515 A | 6/2000 |
| JP | 2001227982 A | 8/2001 |
| JP | 2001514992 A | 9/2001 |
| JP | 200525497 A | 1/2005 |
| JP | 2006-163615 A | 6/2006 |
| JP | 2012-194175 A | 10/2012 |
| JP | 2014-089686 A | 5/2014 |
| JP | 2014215296 A | 11/2014 |
| JP | 2015143979 A | 8/2015 |
| JP | 2017101944 A | 6/2017 |
| WO | 2012/118232 A1 | 9/2012 |
| WO | 2015/068301 A1 | 5/2015 |

OTHER PUBLICATIONS

European Search Report for related EP App. No. 16915188.3 dated Mar. 18, 2020; 10 pages.

Office Action for related JP App. No. 2018536645 dated Mar. 31, 2020. English translation provided; 8 pages.

International Search Report for related International Application No. PCT/JP2016/075840; dated Nov. 29, 2016; English translation provided; 4 pages.

* cited by examiner

FIG. 2

| GRADIENT ANGLE: $\theta_1$[DEG] | | ACCELERATION SENSOR VALUE [M/S$^2$] | | | | |
|---|---|---|---|---|---|---|
| | | $a_1$ | $a_2$ | ... | $a_j$ | ... |
| WHEEL ROTATING SPEED: [RAD/S] | $\omega_1$ | $[K, t_K]_{1,1,1}$ | $[K, t_K]_{1,2,1}$ | ... | $[K, t_K]_{1,j,1}$ | ... |
| | $\omega_2$ | $[K, t_K]_{2,1,1}$ | $[K, t_K]_{2,2,1}$ | ... | $[K, t_K]_{2,j,1}$ | ... |

| GRADIENT ANGLE: $\theta_2$[DEG] | | ACCELERATION SENSOR VALUE [M/S$^2$] | | | | |
|---|---|---|---|---|---|---|
| | | $a_1$ | $a_2$ | ... | $a_j$ | ... |
| WHEEL ROTATING SPEED: [RAD/S] | $\omega_1$ | $[K, t_K]_{1,1,2}$ | $[K, t_K]_{1,2,2}$ | ... | $[K, t_K]_{1,j,2}$ | ... |
| | $\omega_2$ | $[K, t_K]_{2,1,2}$ | $[K, t_K]_{2,2,2}$ | ... | $[K, t_K]_{2,j,2}$ | ... |
| | ... | ... | ... | ... | ... | ... |
| | $\omega_i$ | $[K, t_K]_{1,1,2}$ | $[K, t_K]_{1,2,2}$ | ... | $[K, t_K]_{i,j,2}$ | ... |

| GRADIENT ANGLE: $\theta_2$[DEG] | | ACCELERATION SENSOR VALUE [M/S$^2$] | | | | |
|---|---|---|---|---|---|---|
| | | $a_1$ | $a_2$ | ... | $a_j$ | ... |
| WHEEL ROTATING SPEED: [RAD/S] | $\omega_1$ | $[K, t_K]_{1,1,h}$ | $[K, t_K]_{1,2,h}$ | ... | $[K, t_K]_{1,j,h}$ | ... |
| | $\omega_2$ | $[K, t_K]_{2,1,h}$ | $[K, t_K]_{2,2,h}$ | ... | $[K, t_K]_{2,j,h}$ | ... |
| | ... | ... | ... | ... | ... | ... |
| | $\omega_i$ | $[K, t_K]_{1,1,h}$ | $[K, t_K]_{1,2,h}$ | ... | $[K, t_K]_{i,j,h}$ | ... |
| | ... | ... | ... | ... | ... | ... |

FIG. 3

| | | SENSITIVITY COEFFICIENT, OFFSET COEFFICIENT, TIME |
|---|---|---|
| TEMPERATURE [°C] | $T_1$ | $[A, B, t_{AB}]_1$ |
| | $T_2$ | $[A, B, t_{AB}]_2$ |
| | ... | ... |
| | $T_n$ | $[A, B, t_{AB}]_n$ |
| | ... | ... |

VELOCITY CALCULATION APPARATUS, CONTROL METHOD, PROGRAM AND STORAGE MEDIUM

CROSS-REFERENCE TO RELATED APPLICATIONS

This application is a U.S. National Stage entry of PCT Application No: PCT/JP2016/075840 filed Sep. 2, 2016, the contents of which are incorporated herein by reference.

TECHNICAL FIELD

The present invention relates to a technology for accurately estimating a vehicle body velocity.

BACKGROUND TECHNIQUE

There is known a technology of accurately estimating a vehicle body velocity. For example, Patent Reference-1 discloses a method for estimating the velocity of the own vehicle based on the result of measurement of distance and relative velocity between a surrounding object and the own vehicle by using a measurement device such as LIDAR (Light Detection and Ranging, or Laser Illuminated Detection and Ranging). Patent Reference-2 discloses a method for estimating the velocity of the travelling own vehicle based on captured images of the road surface illustrated by multiple lights.

Patent Reference-1: Japanese Patent Application Laid-open under No. 2014-089686
Patent Reference-2: International Publication WO2015/68301

DISCLOSURE OF INVENTION

Problem to be Solved by the Invention

According to the method disclosed in Patent Reference-1 or in Patent Reference-2, it is possible to accurately estimate the vehicle body velocity. Unfortunately, according to the estimation method disclosed in Patent Reference-1 or in Patent Reference-2, there is such a case that the vehicle body velocity cannot be estimated. For example, according to the estimation method disclosed in Patent Reference-1, it cannot estimate the vehicle body velocity if there is no nearby object. In this case, it is necessary to estimate the vehicle body velocity according to another method.

The above is an example of issues to be solved by the present invention. An object of the present invention is to provide a velocity calculation device capable of accurately estimating the vehicle body velocity.

Means for Solving the Problem

One invention is a velocity calculation apparatus including: an acquisition unit configured to acquire first velocity of a moving body and moving body information on the moving body, the first velocity being based on information on surroundings of the moving body; a storage unit storing calculation values for calculating a velocity of the moving body, each of the calculation values being associated with moving body information on the moving body; and a controller configured, at a time when the first velocity can be acquired, to determine the first velocity as a second velocity and at a time when the first velocity cannot be acquired, to calculate the second velocity based on the moving body information acquired by the acquisition unit and a corresponding calculation value that is among the calculation values, the corresponding calculation value corresponding to the moving body information acquired by the acquisition unit.

Another invention is a control method executed by a velocity calculation apparatus which includes a storage unit storing calculation values for calculating a velocity of a moving body, each of the calculation values being associated with moving body information on the moving body, the control method including: an acquisition process to acquire first velocity of the moving body and moving body information on the moving body, the first velocity being based on information on surroundings of the moving body; a control process, at a time when the first velocity can be acquired, to determine the first velocity as a second velocity and at a time when the first velocity cannot be acquired, to calculate the second velocity based on the moving body information acquired by the acquisition process and a corresponding calculation value that is among the calculation values, the corresponding calculation value corresponding to the moving body information acquired by the acquisition process.

Still another invention is a program executed by a computer of a velocity calculation apparatus which includes a storage unit storing calculation values for calculating a velocity of a moving body, each of the calculation values being associated with moving body information on the moving body, the program making the computer function as: an acquisition unit configured to acquire first velocity of the moving body and moving body information on the moving body, the first velocity being based on information on surroundings of the moving body; a controller configured, at a time when the first velocity can be acquired, to determine the first velocity as a second velocity and at a time when the first velocity cannot be acquired, to calculate the second velocity based on the moving body information acquired by the acquisition unit and a corresponding calculation value that is among the calculation values, the corresponding calculation value corresponding to the moving body information acquired by the acquisition unit.

BRIEF DESCRIPTION OF THE DRAWINGS

FIG. 2 illustrates illustrates an example of the data structure of a K table.
FIG. 3 illustrates illustrates an example of the data structure of an AB table.

DETAILED DESCRIPTION OF THE PREFERRED EMBODIMENTS

Figure 1:
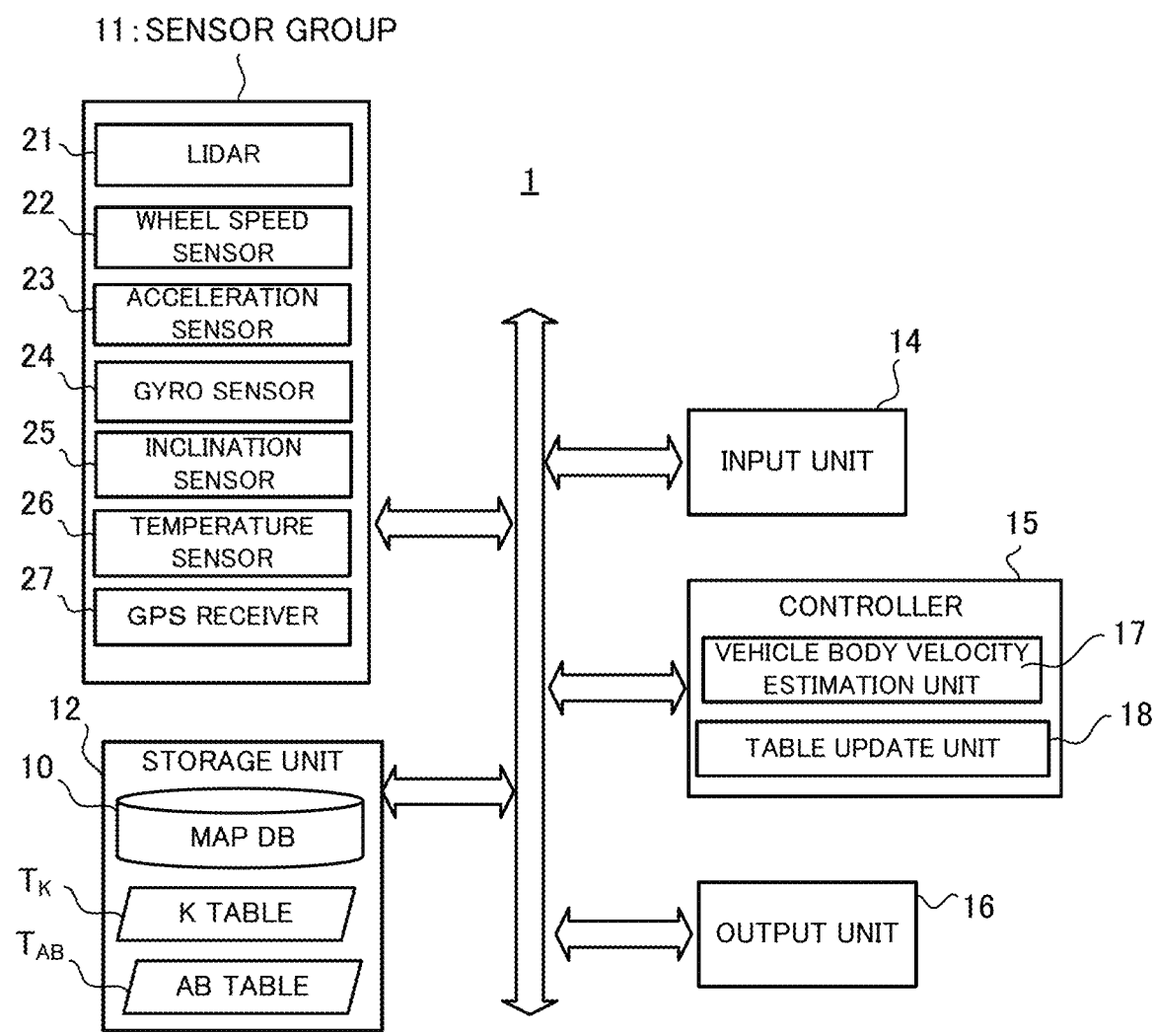
FIG. 1 illustrates a schematic configuration of a vehicle mounted apparatus.

According to a preferable embodiment of the present invention, there is provided a velocity calculation apparatus including: an acquisition unit configured to acquire first velocity of a moving body and moving body information on the moving body, the first velocity being based on information on surroundings of the moving body; a storage unit storing calculation values for calculating a velocity of the moving body, each of the calculation values being associated with moving body information on the moving body; and a controller configured, at a time when the first velocity can be acquired, to determine the first velocity as a second velocity and at a time when the first velocity cannot be acquired, to calculate the second velocity based on the moving body information acquired by the acquisition unit and a corresponding calculation value that is among the calculation values, the corresponding calculation value corresponding to the moving body information acquired by the acquisition unit.

The above velocity calculation apparatus includes an acquisition unit, a storage unit and a controller. The acquisition unit acquires first velocity of a moving body based on information on surroundings of the moving body and moving body information on the moving body. The storage unit stores calculation values for calculating a velocity of the moving body, each of the calculation values being associated with moving body information on the moving body. The term "calculation value" herein indicates a coefficient (parameter) and the like needed to calculate a velocity of a moving body through an approach which is different from the approach for calculating the first velocity. At the time when the first velocity can be acquired, the controller determines the first velocity as a second velocity. At the time when the first velocity cannot be acquired, the controller calculates the second velocity based on the moving body information acquired by the acquisition unit and a corresponding calculation value that is among the calculation values in the storage unit and that corresponds to the moving body information acquired by the acquisition unit. According to this mode, even if the velocity calculation apparatus cannot acquire the first velocity of the moving body based on the information on surroundings of the moving body, the velocity calculation apparatus can retrieve, from the storage unit, a calculation value corresponding to the moving body information acquired by the acquisition unit as a corresponding calculation value thereby to calculate the second velocity from the corresponding calculation value.

In one mode of the velocity calculation apparatus, at the time when the first velocity can be acquired, the controller updates, on a basis of the first velocity, a calculation value to be stored on the storage unit in a state of being associated with the moving body information acquired by the acquisition unit. According to this mode, if the velocity calculation apparatus can acquire the reliable first velocity based on information on the surroundings of the moving body, the velocity calculation apparatus can update, on the basis of the first velocity, the calculation value to be stored in a state of being associated with the acquired moving body information. The term "update" herein indicates not only to rewrite (i.e., overwrite) the already-existing calculation value to a new value but also to newly record the calculation value in cases that there is no corresponding calculation value (i.e., there is no target to be overwritten) on the storage unit.

In another mode of the velocity calculation apparatus, at the time when the first velocity can be acquired, the controller stores, on the storage unit in a state of being associated with the moving body information acquired by the acquisition unit, a calculation value that is an average of a calculation value calculated based on the first velocity and a calculation value already stored on the storage unit in a state of being associated with the moving body information acquired by the acquisition unit. According to this mode, even in cases that the latest calculation value has noises, it is possible to reduce the influence.

In still another mode of the velocity calculation apparatus, through an interpolation of calculation values corresponding to the moving body information which is associated with the calculation values, the controller calculates a calculation value to be associated with the moving body information which is not associated with a calculation value on the storage unit. According to this mode, even in cases that the calculation value corresponding to the current running state or the current environmental state of the moving body is not calculated yet, the velocity calculation apparatus can suitably calculate the second velocity by using value(s) obtained though an interpolation of already-calculated calculation values.

In still another mode of the velocity calculation apparatus, the storage unit stores, as a calculation value, at least one of a first coefficient for calculating a third velocity of the moving body based on a wheel rotating speed of the moving body or a second coefficient for calculating a fourth velocity of the moving body based on an acceleration of the moving body, and wherein, at the time when the first velocity cannot be acquired, the controller determines the second velocity based on at least one of the third velocity or the fourth velocity. According to this mode, even if the velocity calculation apparatus cannot acquire the first velocity of the moving body based on the information on the surroundings of the moving body, with reference to the first coefficient and/or the second coefficient stored on the storage unit, the velocity calculation apparatus can determine the second velocity by calculating at least one of the velocity based on the wheel rotating speed of the moving body or the velocity based on the acceleration.

In still another mode of the velocity calculation apparatus, the acquisition unit acquires, as the moving body information, at least one of information indicative of a running state of the moving body or temperature information, wherein, in a case where the acquisition unit acquires the information indicative of the running state, the controller calculates the third velocity by retrieving a first coefficient corresponding to the running state from the storage unit, and wherein, in a case where the acquisition unit acquires the temperature information, the controller calculates the fourth velocity by retrieving a second coefficient corresponding to temperature indicated by the temperature information from the storage unit. Generally, for the third velocity based on the wheel rotating speed, the correct value of the first coefficient to be used varies depending on the running state. For the fourth velocity based on the acceleration, the correct value of the second coefficient to be used varies depending on the temperature. Thus, according to this mode, the velocity calculation apparatus can accurately calculate the third velocity and/or the fourth velocity by retrieving, from the storage unit, the first coefficient determined in accordance with the current running state and the second coefficient determined in accordance with the current temperature.

In still another mode of the velocity calculation apparatus, the storage unit stores at least one of a first table or a second table, the first table indicating a first coefficient per combination of an acceleration, a gradient angle and a wheel rotating speed, the second table indicating a second coefficient per temperature. According to this mode, the velocity calculation apparatus can correctly record or refer to the first coefficient determined in accordance with the current running state and/or the second coefficient determined in accordance with the current temperature.

In still another mode of the velocity calculation apparatus, after calculating the third velocity and the fourth velocity, the controller calculates the second velocity by weighting the third velocity and the fourth velocity based on a time that has elapsed since the first coefficient used for calculation of the third velocity was recorded in the storage unit and a time that has elapsed since the second coefficient used for calculation of the fourth velocity was recorded in the storage unit. According to this mode, the velocity calculation apparatus determines that, the later the time when a first coefficient or a second coefficient is calculated (i.e., recorded in the storage unit) is, the higher the reliability of the first coefficient or the second coefficient becomes. Thereby, the velocity calculation apparatus can calculate the second velocity by using the weights determined in accordance with the above reliability.

In still another mode of the velocity calculation apparatus, the acquisition unit acquires information outputted by an external sensor as the information on surroundings of the moving body, and wherein, at a time of detecting a feature whose position information is stored on the storage unit through the information outputted by the external sensor, the controller determines that the first velocity can be acquired. According to this mode, the velocity calculation apparatus can correctly determine whether or not the first velocity can be acquired from the information on the surroundings of the moving body outputted by an external sensor.

According to a preferable embodiment of the present invention, there is provided a control method executed by a velocity calculation apparatus which includes a storage unit storing calculation values for calculating a velocity of a moving body, each of the calculation values being associated with moving body information on the moving body, the control method including: an acquisition process to acquire first velocity of the moving body and moving body information on the moving body, the first velocity being based on information on surroundings of the moving body; a control process, at a time when the first velocity can be acquired, to determine the first velocity as a second velocity and at a time when the first velocity cannot be acquired, to calculate the second velocity based on the moving body information acquired by the acquisition process and a corresponding calculation value that is among the calculation values, the corresponding calculation value corresponding to the moving body information acquired by the acquisition process. By executing the above control method, even if the velocity calculation apparatus cannot acquire the first velocity of the moving body based on the information on surroundings of the moving body, the velocity calculation apparatus can retrieve, from the storage unit, a calculation value corresponding to the moving body information acquired by the acquisition process as a corresponding calculation value thereby to calculate the second velocity from the corresponding calculation value.

According to a preferable embodiment of the present invention, there is provided a program executed by a computer of a velocity calculation apparatus which includes a storage unit storing calculation values for calculating a velocity of a moving body, each of the calculation values being associated with moving body information on the moving body, the program making the computer function as: an acquisition unit configured to acquire first velocity of the moving body and moving body information on the moving body, the first velocity being based on information on surroundings of the moving body; a controller configured, at a time when the first velocity can be acquired, to determine the first velocity as a second velocity and at a time when the first velocity cannot be acquired, to calculate the second velocity based on the moving body information acquired by the acquisition unit and a corresponding calculation value that is among the calculation values, the corresponding calculation value corresponding to the moving body information acquired by the acquisition unit. By executing the above program, even if the computer cannot acquire the first velocity of the moving body based on the information on surroundings of the moving body, the computer can retrieve, from the storage unit, a calculation value corresponding to the moving body information acquired by the acquisition unit as a corresponding calculation value thereby to calculate the second velocity from the corresponding calculation value. Preferably, the program can be treated in a state that it is stored in a storage medium.

Embodiment

Now, a preferred embodiment of the present invention will be described below with reference to the attached drawings.

[Schematic Configuration]

FIG. 1 illustrates a schematic configuration of a vehicle mounted apparatus 1 according to the embodiment. The vehicle mounted apparatus 1 is a device which accurately estimates the velocity of the body of a vehicle on which the vehicle mounted apparatus 1 is mounted, and mainly includes a sensor group 1*l*, a storage unit 12, an input unit 14, a controller 15 and an output unit 16. The vehicle mounted apparatus 1 is one mode of the "velocity calculation apparatus" according to the present invention.

The sensor group 11 mainly includes a LIDAR 21, a wheel speed sensor 22, an acceleration sensor 23, a gyro sensor 24, an inclination sensor 25, a temperature sensor 26 and a GPS receiver 27.

The LIDAR 21 discretely measures distance to an external object by emitting pulsed laser beams. The LIDAR 21 outputs a point cloud of measurement points each of which is a combination of the distance to an object which reflects the pulsed laser and the emitting angle of the pulsed laser. The LIDAR 21 according to the embodiment is used for detection of landmarks provided on or around a road. Examples of the landmarks include periodically arranged features along a road such as a mile marker, a hundred-meter post, a delineator, a traffic infrastructure (e.g., a signage, a direction signboard and a traffic signal), a utility pole and a street lamp.

A wheel speed sensor 22 measures pulses (referred to as "axle rotation pulses") of a pulse signal generated in response to the rotation of the wheels of the vehicle. The acceleration sensor 23 detects the acceleration in the travelling direction of the vehicle. The gyro sensor 24 detects the angular velocity of the vehicle at the time when the vehicle changes directions. The inclination sensor 25 detects the inclined angle (referred to as "gradient angle θ") with respect to the horizontal plane of the vehicle. The temperature sensor 26 detects the temperature at or near the acceleration sensor 23. The GPS receiver 27 receives an electric wave for transmitting downlink data including position measurement data from plural GPS satellites to thereby detect the absolute position of the vehicle. Output of each sensor in the sensor group 11 is supplied to the controller 15. Output data of at least one of the wheel speed sensor 22, the acceleration sensor 23, the inclination sensor 25 or the temperature sensor 26 is an example of the "moving body information" according to the present invention.

The storage unit 12 stores a program to be executed by the controller 15 and information necessary for the controller 15 to execute a predetermined process. According to the embodiment, the storage unit 12 stores the map database (DB) 10 including the road data and the landmark information. It is noted that the map DB 10 may be periodically updated. In this case, for example, via a communication unit, the controller 15 receives, from a server device which stores map information, partial map information associated with an area of the own vehicle position, and then updates the map DB 10 by using the partial map information. It is noted that instead of the storage unit 12, a server device capable of communicating with the vehicle mounted apparatus 1 may store the map DB 10. In this case, the controller 15 acquires, from the map DB 10, necessary information such as landmark information through the data communication with the server device. Furthermore, the storage unit 12 stores a K table $T_K$ and an AB table $T_{AB}$, wherein the K table $T_K$ stores a conversion coefficient "K" for converting the wheel rotating speed into the vehicle body velocity and the AB table $T_{AB}$ stores combinations of a coefficient (referred to as "sensitivity coefficient A") corresponding to the sensitivity of the acceleration sensor 23 to the true acceleration and an offset coefficient (referred to as "offset coefficient B") of the output value of the acceleration sensor 23 with respect to the true acceleration. As mentioned later, the offset coefficient B is equivalent to the value of the true acceleration at the time when the acceleration outputted by the acceleration sensor 23 is 0. It is noted that the conversion coefficient K is used for calculation of an estimate value (referred to as "axle pulse-based vehicle body velocity $V_p$") of the vehicle body velocity on the basis of the axle rotation pulses outputted by the wheel speed sensor 22, and that the sensitivity coefficient A and the offset coefficient B are used for calculation of an estimate value (referred to as "acceleration-based vehicle body velocity $V_\alpha$") of the vehicle body velocity on the basis of the acceleration outputted by the acceleration sensor 23.

Examples of the input unit 14 include a button, a remote controller and an audio input device for user operations. The output unit 16 is a display and/or a speaker which output under the control of the controller 15, for example.

The controller 15 includes a CPU for executing programs and controls the entire vehicle mounted apparatus 1. The controller 15 according to the embodiment includes a vehicle body velocity estimate unit 17 and a table update unit 18.

The vehicle body velocity estimate unit 17 calculates an estimate value (referred to as "estimated vehicle body velocity $V_E$") of the vehicle body velocity to be used for other process such as calculation of the own vehicle position. When determining that the vehicle body velocity based on the output of the LIDAR 21 can be estimated, the vehicle body velocity estimate unit 17 determines, as the estimated vehicle body velocity $V_E$, the vehicle body velocity (referred to as "measured vehicle body velocity $V_L$") measured on the basis of the output of the LIDAR 21. In contrast, when determining that the measured vehicle body velocity $V_L$ cannot be calculated, the vehicle body velocity estimate unit 17 calculates the axle pulse-based vehicle body velocity $V_p$ and the acceleration-based vehicle body velocity $V_\alpha$, wherein the axle pulse-based vehicle body velocity $V_p$ is an estimate value of the vehicle body velocity based on the axle rotation pulses outputted by the wheel speed sensor 22 and the acceleration-based vehicle body velocity $V_\alpha$ is an estimate value of the vehicle body velocity based on the acceleration in the traveling direction of the vehicle outputted by the acceleration sensor 23. Then, the vehicle body velocity estimate unit 17 calculates the estimated vehicle body velocity $V_E$ by weighting and averaging the axle pulse-based vehicle body velocity $V_p$ and the acceleration-based vehicle body velocity $V_\alpha$.

In this case, the vehicle body velocity estimate unit 17 extracts the conversion coefficient K corresponding to the present running state of the vehicle from the K table $T_K$ and then calculates the axle pulse-based vehicle body velocity $V_p$ according to the following equation (1) that indicates the multiplication of the extracted conversion coefficient K to the wheel rotating speed "ω".

$$V_P[t] = K\omega[t] \qquad (1)$$

The sign "t" indicates a current time t that is the target time of the process. The vehicle body velocity estimate unit 17 extracts, from the AB table $T_{AB}$, the sensitivity coefficient A and the offset coefficient B corresponding to the temperature outputted by the temperature sensor 26 and then calculates the acceleration-based vehicle body velocity $V_\alpha$ according to the following equation (2) by using the extracted sensitivity coefficient A and the offset coefficient B.

$$V_\alpha[t] = V_E[t-1] + \frac{1}{2}(A\alpha[t-1] + B + A\alpha[t] + B)\delta t \qquad (2)$$

The sign "t−1" indicates the last time that the estimated vehicle body velocity $V_E$ is previously calculated, the sign "δt" indicates the time interval between the time t and the time t−1. The description of how to derive the equation (1) and the equation (2) will be given in the "Detail of Estimated Vehicle Body Velocity Calculation Process".

At the time when the vehicle body velocity estimate unit 17 calculates the measured vehicle body velocity $V_L$, the table update unit 18 calculates the conversion coefficient K corresponding to the present running state based on the measured vehicle body velocity $V_L$ thereby to update the K table $T_K$ based on the calculated conversion coefficient K. Similarly, at the time when the vehicle body velocity estimate unit 17 calculates the measured vehicle body velocity $V_L$, the table update unit 18 calculates the sensitivity coefficient A and the offset coefficient B which correspond to the detected present temperature T based on the measured vehicle body velocity $V_L$ thereby to update the AB table $T_{AB}$ based on the calculated sensitivity coefficient A and the offset coefficient B.

It is noted that the controller 15 is an example of the "acquisition unit", the "controller" and a computer which executes the program according to the present invention. The measured vehicle body velocity $V_L$ is an example of the "first velocity" according to the present invention. The estimated vehicle body velocity $V_E$ is an example of the "second velocity" according to the present invention. The axle pulse-based vehicle body velocity $V_p$ is an example of the "third velocity" according to the present invention. The acceleration-based vehicle body velocity $V_\alpha$ is an example of the "fourth velocity" according to the present invention. The information associated with the distance and/or direction to a nearby object detected by the LIDAR 21 is an example of the "information associated with surroundings of the moving body" according to the present invention.

A description will be given of the K table $T_K$ and the AB table $T_{AB}$ stored on the storage unit 13. FIG. 2 illustrates an example of the data structure of the K table $T_K$ and FIG. 3 illustrates an example of the data structure of the AB table $T_{AB}$. As illustrated in FIG. 2, in the K table $T_K$, there are recorded conversion coefficients K in the form of three-dimensional array which includes three parameters: the wheel rotating speed measured based on the axle rotation pulses outputted by the wheel speed sensor 22; the acceleration (referred to as "acceleration sensor value") outputted by the acceleration sensor 23; and the gradient angle outputted by the inclination sensor 25. Each conversion coefficient K corresponding to each type of the running state is recorded in the K table $T_K$ together with the time "$t_K$" when the table update unit 18 records the conversion coefficient K. Every time the vehicle body velocity estimate unit 17 calculates the measured vehicle body velocity $V_L$, a combination of the conversion coefficient K and the time $t_K$ associated with the index value illustrated in FIG. 2 is updated (i.e., newly recorded or rewritten) by the table update unit 18.

Hereinafter, the index value "i" indicates, among all index values (1, 2, . . . ) allocated to wheel rotating speeds ($\omega_1$, $\omega_2$, . . . ) recorded in the K table $T_K$, an index value whose wheel rotating speed is nearest (closest) to the current wheel rotating speed "$\omega$" derived from the current axle rotation pulse which the wheel speed sensor 22 outputs. Similarly, the index value "j" indicates, among all index values (1, 2, . . . ) allocated to acceleration sensor values ($\alpha_1$, $\alpha_2$, . . . ), such an index value whose acceleration sensor value is nearest to the current acceleration sensor value "$\alpha$" which the acceleration sensor 23 outputs. The index value "h" indicates, among all index values (1, 2, . . . ) allocated to gradient angles ($\theta_1$, $\theta_2$, . . . ) such an index value whose gradient angle is nearest to the current gradient angle "$\theta$" which the inclination sensor 25 outputs. The sign "$K_{i,j,h}$" indicates the conversion coefficient K corresponding to the wheel rotating speed $\omega_i$, acceleration sensor value $\alpha_j$, gradient angle $\theta_h$ each of which is the nearest values to the output of each sensor, and the index value thereof is expressed by (i, j, k). As described later, in cases that the vehicle body velocity estimate unit 17 calculates the measured vehicle body velocity VI, the table update unit 18 calculates the conversion coefficient K based on the measured vehicle body velocity $V_L$ and updates the data corresponding to the index value (i, j, k) in the K table $T_K$ by using the calculated conversion coefficient K and the current time t.

As illustrated in FIG. 3, in the AB table $T_{AB}$, there are recorded each combination of the sensitivity coefficient A and the offset coefficient B with respect to each temperature to be detected by the temperature sensor 26. Each combination of the sensitivity coefficient A and the offset coefficient B with respect to each temperature is recorded in the AB table $T_{AB}$ together with the time "$t_{AB}$" when the table update unit 18 records the combination of the sensitivity coefficient A and the offset coefficient B. Every time the vehicle body velocity estimate unit 17 calculates the measured vehicle body velocity $V_L$, a combination of the sensitivity coefficient A, the offset coefficient B and the time $t_{AB}$ associated with the index values illustrated in FIG. 3 is updated (i.e., newly recorded or rewritten) by the table update unit 18.

Hereinafter, the index value "n" indicates, among all index values (1, 2, . . . ) allocated to temperatures ($T_1$, $T_2$, . . . ) recorded in the AB table $T_{AB}$, an index value whose temperature is nearest to the current temperature "T" which the temperature sensor 26 detects. The signs "$A_n$" and "$B_n$" indicate the sensitivity coefficient A and the offset coefficient B corresponding to the temperature $T_n$ nearest to the current temperature which the temperature sensor 26 detects and the index value of the sensitivity coefficient A and the offset coefficient B is expressed as (n). As mentioned later, in cases that the vehicle body velocity estimate unit 17 calculates the measured vehicle body velocity $V_L$, the table update unit 18 calculates the sensitivity coefficient A and the offset coefficient B based on the measured vehicle body velocity $V_L$ and updates the data corresponding to the index value (n) in the AB table $T_{AB}$ by using the calculated sensitivity coefficient A, offset coefficient B and the current time t.

It is noted that the conversion coefficient K is an example of each of the "calculation value" and the "first coefficient" according to the present invention and that a combination of the sensitivity coefficient A and the offset coefficient B is example of each of the "calculation value" and the "second coefficient" according to the present invention. The K table $T_K$ is an example of the "first table" according to the present invention and the AB table $T_{AB}$ is an example of the "second table" according to the present invention.

[Overview of Estimated Vehicle Body Calculation Process]

Next, a description will be given of the overview of the calculation method for the estimated vehicle body velocity $V_E$. Summarily, at the time of determining that the measured vehicle body velocity $V_L$ can be calculated, the controller 15 calculates the measured vehicle body velocity $V_L$ as the estimated vehicle body velocity $V_E$ while performing the process of updating the K table $T_K$ and the AB table $T_{AB}$. In contrast, at the time of determining that it cannot calculate the measured vehicle body velocity $V_L$, the controller 15 extracts the conversion coefficient K from the K table $T_K$ based on the detected running state while extracting the sensitivity coefficient A and the offset coefficient B from the AB table $T_{AB}$ based on the temperature outputted by the temperature sensor 26. Then, the controller 15 calculates the axle pulse-based vehicle body velocity $V_p$ from the extracted conversion coefficient K and the acceleration-based vehicle body velocity $V_\alpha$ from the extracted sensitivity coefficient A and offset coefficient B to calculate the estimated vehicle body velocity $V_E$ by weighting and averaging the axle pulse-based vehicle body velocity $V_p$ and the acceleration-based vehicle body velocity $V_\alpha$.

Specifically, first, at the time of determining that there is a landmark, which is needed to measure the vehicle body velocity by the LIDAR 21, within the measurable range by the LIDAR 21, the controller 15 calculates the measured vehicle body velocity $V_L$ based on the variation of relative position of the landmark specified by the output by the LIDAR 21. The description of the determination on possibility of calculating the measured vehicle body velocity $V_L$ will be explained in the section "Detail of Estimated Vehicle Body Velocity Calculation Process".

Furthermore, by using the calculated measured vehicle body velocity $V_L$, the controller 15 performs an update process of the K table $T_K$ and the AB table $T_{AB}$. Specifically, by using the conversion coefficient K derived on the basis of the measured vehicle body velocity $V_L$, the controller 15 updates (includes "newly registers") the conversion coefficient $K_{i,j,h}$ whose index value is (i, j, k) and the recording time $t_K$, wherein the index value (i, j, k) corresponds to the wheel rotating speed $\omega_i$ in the K table $T_K$ nearest to the current wheel rotating speed $\omega$ measured on the basis of the axle rotation pulses outputted by the wheel speed sensor 22, the acceleration sensor value $\alpha_j$ in the K table $T_K$ nearest to the current acceleration sensor value $\alpha$ outputted by the acceleration sensor 23 and the gradient angle $\theta$ in the K table $T_K$ nearest to the current gradient angle $\theta$ outputted by the inclination sensor 25. In this case, as mentioned later, if there is already recorded data of the conversion coefficient $K_{i,j,h}$ and the time $t_K$ corresponding to the index value (i,j,h) in the K table $T_K$, the controller 15 determines the conversion coefficient $K_{i,j,h}$ to be recorded in the K table $T_K$ by averaging the already-recorded conversion coefficient $K_{i,j,h}$ and the conversion coefficient K calculated at the current time t. A detailed description will be given later of an approach for calculating the conversion coefficient K based on the measured vehicle body velocity $V_L$ and the above averaging process.

In the same way, by using the sensitivity coefficient A and the offset coefficient B calculated on the basis of the measured vehicle body velocity $V_L$, the controller 15 updates (includes "newly registers") the sensitivity coefficient A, the offset coefficient B and the time $t_{AB}$ corresponding to the index value (n) corresponding to the temperature $T_n$ in the AB table $T_{AB}$ nearest to the current temperature T outputted by the temperature sensor 26. In this case, as mentioned later, if there is already recorded data of the sensitivity coefficient $A_n$, offset coefficient $B_n$ and the time $t_{AB}$ corresponding to the index value (n) in the AB table $T_{AB}$, the controller 15 determines the sensitivity coefficient $A_n$ and the offset coefficient $B_n$ to be recorded in the AB table $T_{AB}$ by averaging the already-recorded sensitivity coefficient $A_n$ and the sensitivity coefficient A at the current time t and by averaging the already-recorded offset coefficient $B_n$ and the offset coefficient B at the current time t. A detailed description will be given later of an approach for calculating the sensitivity coefficient A and the offset coefficient B based on the measured vehicle body velocity $V_L$ and the above averaging process.

In contrast, at the time of determining that the measured vehicle body velocity $V_L$ cannot be calculated, the controller 15 extracts from the K table $T_K$ the conversion coefficient $K_{i,j,h}$ corresponding to the index value (i, j, h) indicative of the nearest values to the wheel rotating speed $\omega$ outputted by the wheel speed sensor 22, the acceleration sensor value $\alpha$ outputted by the acceleration sensor 23 and the gradient angle $\theta$ outputted by the inclination sensor 25. Thereby, the controller 15 calculates the axle pulse-based vehicle body velocity $V_p$ according to the above-mentioned equation (1). As mentioned later, the proper value of the conversion coefficient K varies depending on the running state of the vehicle. Thus, according to this approach, the controller 15 can use the conversion coefficient K calculated in substantially the same state as the current running state thereby to raise the accuracy of the axle pulse-based vehicle body velocity $V_p$.

The controller 15 extracts from the AB table $T_{AB}$ the combination of the sensitivity coefficient $A_n$ and the offset coefficient $B_n$ corresponding to the index value (n) indicative of the nearest temperature to temperature T outputted by the temperature sensor 26 and calculates the acceleration-based vehicle body velocity $V_\alpha$ according to the above-mentioned equation (2). As mentioned later, proper values of the sensitivity coefficient A and the offset coefficient B vary depending on the temperature environment of the acceleration sensor 23. Thus, according to this approach, the controller 15 can use the sensitivity coefficient A and the offset coefficient B calculated in substantially the same temperature environment as the current temperature environment thereby to raise the accuracy of the acceleration-based vehicle body velocity $V_\alpha$. Each of the conversion coefficient $K_{i,j,h}$, the sensitivity coefficient $A_n$ and the offset coefficient $B_n$ is an example of the "corresponding calculation value".

Next, a description will be given of the weighting (weighted averaging) for calculating the estimated vehicle body velocity $V_E$ from the axle pulse-based vehicle body velocity $V_p$ and the acceleration-based vehicle body velocity $V_\alpha$.

The controller 15 determines that the larger the time difference "$\Delta t_K$" between the current time t and the time $t_K$ of recording the conversion coefficient K retrieved from the K table $T_K$ is, the lower the degree of the reliability of the retrieved conversion coefficient K and the axle pulse-based vehicle body velocity $V_p$ calculated from the conversion coefficient K becomes. Thus, the controller 15 decreases the weight on the axle pulse-based vehicle body velocity $V_p$ with increasing time difference $\Delta t_K$. The controller 15 determines that the larger the time difference "$\Delta t_{AB}$" between the current time t and the time $t_{AB}$ of recording the sensitivity coefficient A and the offset coefficient B retrieved from the AB table $T_{AB}$ is, the lower the degree of the reliability of the retrieved sensitivity coefficient A, offset coefficient B and the acceleration-based vehicle body velocity $V_\alpha$ calculated therefrom becomes. Thus, the controller 15 decreases the weight on the acceleration-based vehicle body velocity $V_\alpha$ with increasing time difference $\Delta t_{AB}$.

In response to the above consideration, according to the embodiment, as an example of the weighting approach, the controller 15 calculates the estimated vehicle body velocity $V_E$ from the axle pulse-based vehicle body velocity $V_p$ and the acceleration-based vehicle body velocity $V_\alpha$ based on the following equation (3).

$$V_E[t] = \frac{\Delta t_{AB}}{\Delta t_K + \Delta t_{AB}} V_p[t] + \frac{\Delta t_K}{\Delta t_K + \Delta t_{AB}} V_\alpha[t] \qquad (3)$$

According to the equation (3), the controller 15 determines a larger weight on the vehicle body velocity calculated by parameter(s), either the conversion coefficient K or the combination of the sensitivity coefficient A and the offset coefficient B, whose elapsed time from the calibration is shorter. Accordingly, the controller 15 can steadily calculate the estimated vehicle body velocity $V_E$ with a high degree of reliability.

Figure 4:
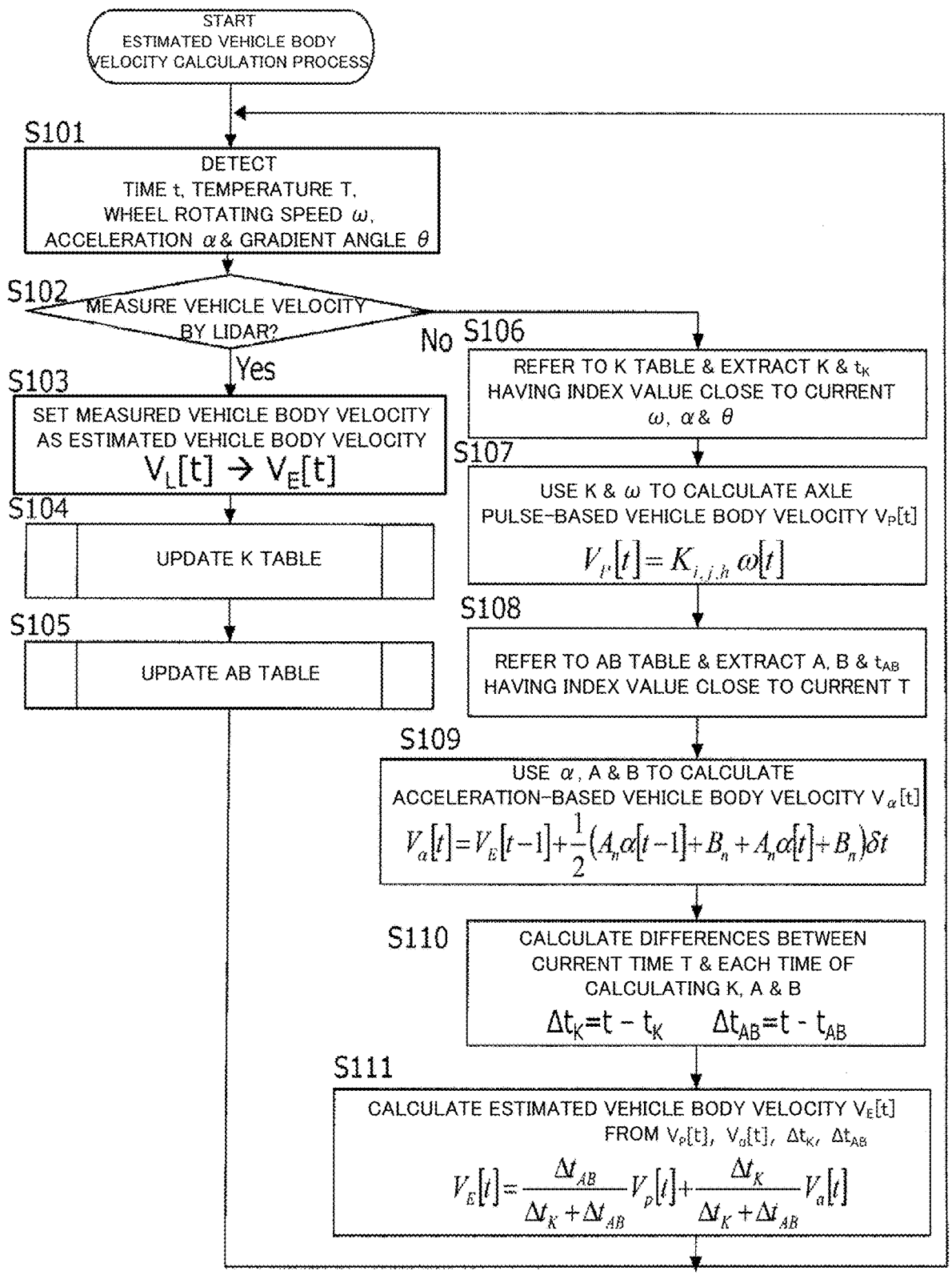
FIG. 4 is a flowchart indicative of the overview of estimated vehicle body velocity calculation process.

FIG. 4 is a flowchart indicative of the overview of the estimated vehicle body velocity calculation process according to the embodiment.

First, the controller 15 recognizes the current time t and acquires: the temperature T at the time t based on the output of the temperature sensor 26; the wheel rotating speed $\omega$ at the time t based on the output of the wheel speed sensor 22; the acceleration sensor value $\alpha$ at the time t based on the output of the acceleration sensor 23; and the gradient angle $\theta$ at the time t based on the output of the inclination sensor 25 (step S101).

Next, the controller 15 determines whether or not it is possible to measure the vehicle body velocity by the LIDAR 21 (step S102). Namely, the controller 15 determines whether or not the measured vehicle body velocity $V_L$ can be calculated. The detail of the determination method will be given later. Then, when the controller 15 determines that it is possible to measure the vehicle body velocity by the LIDAR 21 (step S102; Yes), the controller 15 proceeds with the process at step S103 to step S105. In contrast, when the controller 15 determines that it is impossible to measure the vehicle body velocity by the LIDAR 21 (step S102; No), the controller 15 proceeds with the process at step S106 to step S111.

First, a description will be given of the process at step S103 to step S105 executed in cases that the vehicle body velocity can be measured by the LIDAR 21.

The controller 15 calculates the measured vehicle body velocity $V_L$ based on the output of the LIDAR 21 through a known method and sets the measured vehicle body velocity $V_L$ as the estimated vehicle body velocity $V_E$ (step S103). Then, the controller 15 executes the update process of the K table $T_K$ (step S104). In this case, by executing the flowchart illustrated in FIG. 8 to be mentioned later, the controller 15 calculates and updates the conversion coefficient $K_{i,j,h}$ corresponding to the index value (i, j, h) in the K table $T_K$. Furthermore, the controller 15 executes the update process of the AB table $T_{AB}$ (step S105). In this case, by executing the flowchart illustrated in FIG. 9 to be mentioned later, the controller 15 calculates and updates the sensitivity coefficient $A_n$ and the offset coefficient $B_n$ corresponding to the index value (n) in the AB table $T_{AB}$.

Next, a description will be given of the process at step S106 to step S111 executed in cases that the vehicle body velocity cannot be measured by the LIDAR 21.

First, with reference to the K table $T_K$, the controller 15 extracts the recording time $t_K$ and the conversion coefficient $K_{i,j,h}$ of the index value (i, j, h) closest to the current wheel rotating speed ω, the current acceleration sensor value α and the current gradient angle θ which are acquired at step S101 (step S106). It is noted that if there is no recorded data of the recording time $t_K$ and the conversion coefficient $K_{i,j,h}$ of the index value (i, j, h) in the K table $T_K$, the controller 15, for example, extracts the recording time $t_K$ and the conversion coefficient K of the index value closest to the index value (i, j, h) among all index values having data of the recording time $t_K$ and the conversion coefficient K. Then, by using the conversion coefficient $K_{i,j,h}$ extracted from the K table $T_K$ at step S106 and the wheel rotating speed ω detected at the step S101, the controller 15 calculates the axle pulse-based vehicle body velocity $V_P$ [t] at the current time t according to the equation (1) (step S107).

Additionally, with reference to the AB table $T_{AB}$, the controller 15 extracts the sensitivity coefficient $A_n$, the offset coefficient $B_n$ and the recording time $t_{AB}$ of the index value (n) corresponding to the temperature closest to the current temperature T acquired at step S101 (step S108). It is noted that if there is no recorded data of the sensitivity coefficient $A_n$, the offset coefficient $B_n$ and the recording time $t_{AB}$ of the index value (i, j, h) in the AB table $T_{AB}$, the controller 15 may, for example, extract the sensitivity coefficient A, the offset coefficient B and the recording time $t_{AB}$ of the index value closest to the index value (n) among all index values having data of the sensitivity coefficient A, the offset coefficient B and the recording time $t_{AB}$. Then, by using the acceleration sensor value α detected at step S101 and the sensitivity coefficient $A_n$ and the offset coefficient $B_n$ which are extracted at step S108, the controller 15 calculates the acceleration-based vehicle body velocity $V_α$ [t] at the time t according to the equation (2) (step S109).

Next, the controller 15 calculates the time difference $\Delta t_K$ between the current time t and the recording time $t_K$ extracted at step S106 and the time difference $\Delta t_{AB}$ between the current time t and the recording time $t_{AB}$ extracted at step S108 (step S110). Then, on the basis of the axle pulse-based vehicle body velocity $V_P$ [t] calculated at step S107, the acceleration-based vehicle body velocity $V_P$ [t] calculated at step S109, and the time difference $\Delta t_K$ and the time difference $\Delta t_{AB}$ calculated at step S110, the controller 15 calculates the estimated vehicle body velocity $V_E$ [t] at the current time t according to the equation (3) (step S111).

In this way, every time the controller 15 measures the vehicle body velocity by the LIDAR 21 which measures a landmark, the controller 15 updates the K table $T_K$ and the AB table $T_{AB}$. Thereby, the controller 15 can suitably maintain the reliability of the axle pulse-based vehicle body velocity $V_P$ and the acceleration-based vehicle body velocity $V_α$ calculated at the time when the vehicle body velocity cannot be measured by the LIDAR 21. Additionally, even when the controller 15 cannot calculate the measured vehicle body velocity $V_L$, the controller 15 can correctly estimate the vehicle body velocity by extracting, from the K table $T_K$ and the AB table $T_{AB}$, the conversion coefficient K, the sensitivity coefficient A and the offset coefficient B which were calibrated in a running state and a temperature environment close to the current running state and the current temperature environment.

[Detail of Estimated Vehicle Body Velocity Calculation Process]

(1) Basic Explanation

Figure 5:
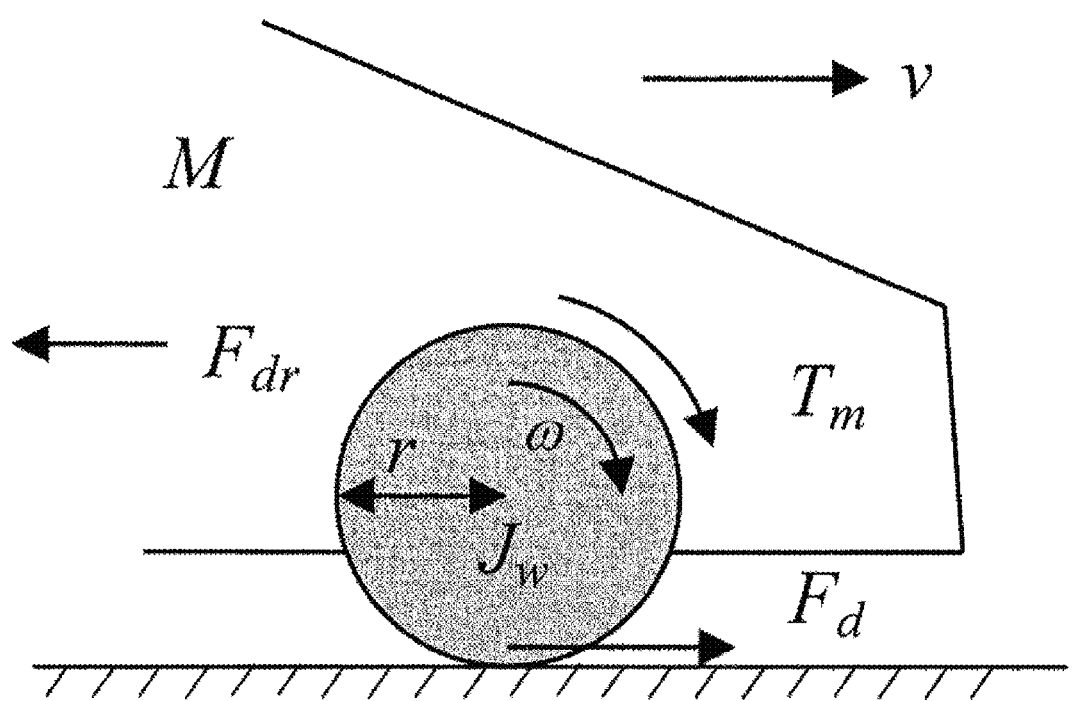
FIG. 5 illustrates signs each of which indicates a running state of the vehicle.

First, a description will be given of fundamental issues on which the following explanation is based. FIG. 5 illustrates signs each of which indicates a running state of the vehicle. In FIG. 5, the sign "$T_m$" stands for torque around the axle, the sign "$F_d$" stands for the driving force of the vehicle, the sign "$F_{dr}$" stands for the running resistance, the sign "ω" stands for the wheel rotating speed, the sign "v" stands for vehicle body velocity, the sign "$J_w$" stands for the wheel inertia, the sign "M" stands for the weight of the vehicle, the sign "r" stands for the wheel (tire) radius, the sign "slip ratio λ" stands for the slip ratio, the sign "μ" stands for the friction coefficient, the sign "N" stands for the normal force from the ground, the sign "$F_a$" stands for the air resistance, the sign "$F_r$" stands for the rolling resistance, the sign "$F_θ$" stands for the gradient resistance, the sign "ρ" stands for the air density, the sign "$C_D$" stands for the air resistance coefficient, the sign "S" stands for the front projected area of the vehicle, the sign "$μ_r$" stands for the rolling resistance coefficient and the sign "θ" stands for the gradient angle.

In this case, the equation of motion in the travelling direction of the vehicle is generally expressed as the following equations (4) to (8).

$$M\frac{dv}{dt} = F_d - F_{dr} \quad (4)$$

$$J_w\frac{d\omega}{dt} = T_m - rF_d \quad (5)$$

$$F_d = \mu N \quad (6)$$

$$\lambda = \frac{r\omega - v}{\text{Max}(r\omega, v)} \quad (7)$$

-continued $$F_{dr} = F_a + F_r + F_\theta \quad (8)$$
$$= \frac{1}{2}\rho C_D S v^2 + \mu_r Mg\cos\theta + Mg\sin\theta$$

Figure 6A:
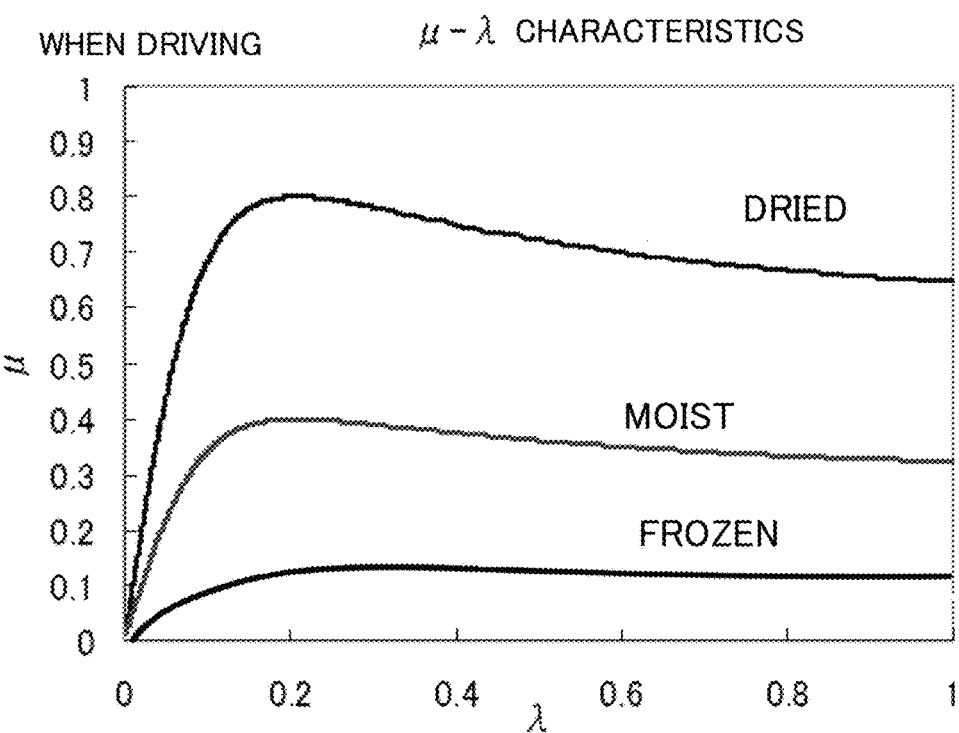
FIG. 6A illustrates the relation between the friction coefficient and the slip ratio in the driving state of the vehicle.
Figure 6B:
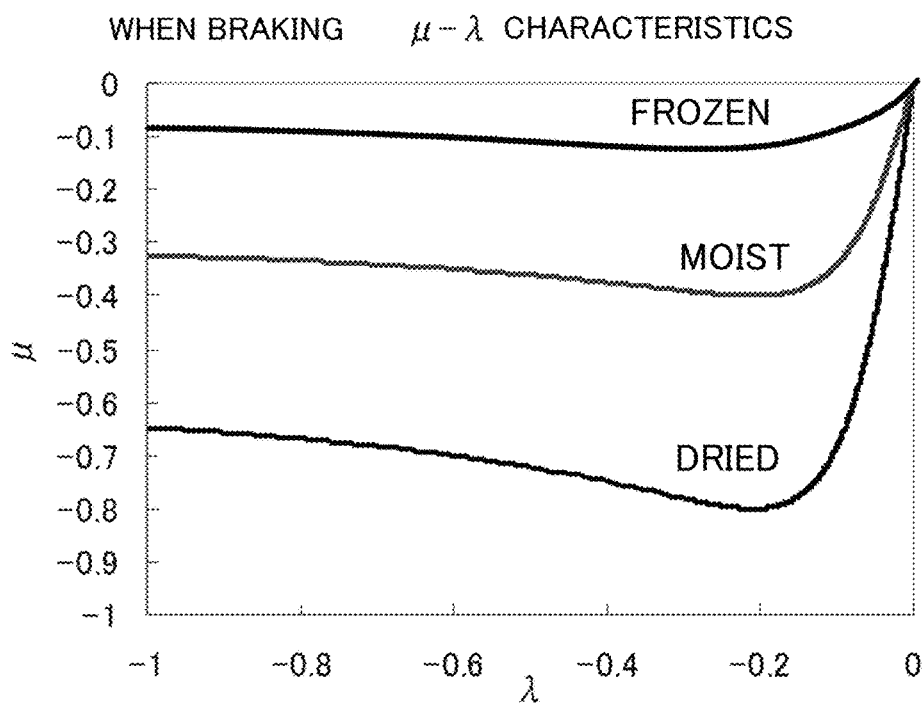
FIG. 6B illustrates the relation between the friction coefficient and the slip ratio in the braking state of the vehicle.

The friction coefficient μ and the slip ratio λ depend on whether the vehicle is in the driving state or in the braking state and also depend on the road surface condition. FIG. 6A illustrates the relation between the friction coefficient μ (vertical axis) and the slip ratio λ (horizontal axis) in the driving state of the vehicle and FIG. 6B illustrates the relation between the friction coefficient μ (vertical axis) and the slip ratio λ (horizontal axis) in the braking state of the vehicle. FIG. 6A and FIG. 6B illustrate graphs indicative of the relation between the friction coefficient μ and the slip ratio λ in each road surface condition "DRIED", "MOIST" and "FROZEN".

(2) Calculation of Conversion Coefficient and Axle Pulse-Based Vehicle Body Velocity First, a description will be given of the calculation method of the conversion coefficient K.

When the above-mentioned equation (7) is modified, the following equation is acquired.

$$\begin{cases} v = r(1-\lambda)\omega & (v < r\omega) \\ v = \dfrac{r}{1+\lambda}\omega & (r\omega < v) \end{cases}$$

Then, the conversion coefficient K is set hereinafter as follows.

$$\begin{cases} K = r(1-\lambda) & (v < r\omega) \\ K = \dfrac{r}{1+\lambda} & (r\omega < v) \end{cases}$$

In this case, the following equation can be acquired.

$$v = K\omega$$

When the vehicle body velocity can be measured by the LIDAR 21, the measured vehicle body velocity $V_L$ can be expressed as the following equation (9) with the wheel rotating speed ω [t] at the time t.

$$V_L[t] = K\omega[t] \quad (9)$$

Thus, if the controller 15 can calculate the measured vehicle body velocity $V_L$ [t], the controller 15 can calculate the conversion coefficient K (=$V_L$[t]/ω[t]) according to the equation (9) by using the measured vehicle body velocity $V_L$ [t] and the wheel rotating speed ω [t] that is based on the axle rotation pulses outputted by the wheel speed sensor 22. In contrast, if the controller 15 cannot measure the vehicle body velocity by the LIDAR 21, the controller 15 can calculate the axle pulse-based vehicle body velocity $V_p$ [t] at the time t according to the equation (1) by using the wheel rotating speed ω [t] at the time t and the conversion coefficient K.

A supplemental description will be given of the relation between the vehicle body velocity v and the wheel speed (that is equivalent to "rω").

When the vehicle travels at a constant speed, the driving force $F_d$ equivalent to the running resistance $F_{dr}$ is needed according to the equation (4). In order to obtain the running resistance $F_{dr}$, the friction coefficient μ is needed to be larger than 0 according to equation (6). Furthermore, as illustrated in FIG. 6A, to make the friction coefficient μ larger than 0, the slip ratio λ is needed to be larger than 0. When the slip ratio λ is larger than 0, "rω" corresponding to the wheel speed is larger than the vehicle body velocity v according to the equation (7). Thus, the larger the running resistance $F_{dr}$ is, the larger the wheel speed relative to the vehicle body velocity v becomes. Additionally, the gradient resistance $F_\theta$ and the running resistance $F_{dr}$ increases with increasing gradient angle θ and the gradient resistance $F_\theta$ and the running resistance $F_{dr}$ decreases with decreasing gradient angle θ. Thus, even when the vehicle travels at a constant speed, the difference between the vehicle body velocity and the wheel speed varies depending on the gradient angle θ.

When putting the foot down on the accelerator pedal further, the torque $T_m$ increases. Thus, according to the equation (5), the difference between the torque $T_m$ and the product $rF_d$ of the wheel radius r and the driving force $F_d$ increases with increasing torque $T_m$ and the wheel rotating speed ω also increases. As the wheel rotating speed ω increases, the wheel speed (rω) relative to the vehicle body velocity increases and therefore the slip ratio λ also increases according to the equation (7). As a result, according to the μ-λ characteristics as illustrated in FIG. 6, the friction coefficient μ increases with increasing the friction coefficient μ and the driving force $F_d$ also increases according to the equation (6). In this case, if the vehicle is in such a state that the running resistance $F_{dr}$ does not change, the vehicle body velocity v increases and therefore the vehicle accelerates according to the equation (4). Thus, in this case, because the vehicle body velocity v increases a little after the increase of the wheel speed (rω), the wheel speed (rω) is larger than the vehicle body velocity v during the acceleration of the vehicle. In contrast, when the brake pedal is putted down and the vehicle decelerates, the phenomena opposite to the phenomena at the time of the acceleration occur. Thus, during the deceleration, the wheel speed (rω) is smaller than the vehicle body velocity v.

Generally, though the wheel radius r possibly varies in response to the change of the variation of the air pressure, it does not substantially change in most cases. In contrast, the slip ratio λ dynamically varies depending on the running state. Specifically, if the vehicle accelerates or decelerates, the vehicle body velocity v varies and therefore the air resistance $F_a$ also varies according to the equation (8). If the gradient angle θ varies, the rolling resistance $F_r$ and the gradient resistance $F_\theta$ also vary. Since the running resistance $F_{dr}$ varies in either case, the vehicle body velocity v indicated by the equation (4) varies and the slip ratio λ also varies accordingly.

In this way, as the running resistance $F_{dr}$ which varies depending on the gradient angle θ is large or the change in the acceleration is large, the difference between the wheel speed and the vehicle body velocity becomes large. Thus, with a single conversion coefficient K, it is impossible to obtain the correct vehicle body velocity from the wheel speed. In response to the above consideration, according to the embodiment, the controller 15 stores the K table $T_K$ in which the conversion coefficient K is recorded per combination of the gradient angle, the acceleration and the wheel rotating speed thereby to calculate the axle pulse-based vehicle body velocity $V_p$ by using the conversion coefficient $K_{i,j,h}$ of the index value (i,j,h) which has the nearest values to the detected wheel rotating speed ω, the acceleration sensor value α and the gradient angle θ. Thereby, the controller 15 can accurately calculate the axle pulse-based vehicle body velocity $V_p$ from the wheel rotating speed ω.

(3) Calculation of Sensitivity Coefficient, Offset Coefficient and Acceleration-Based Vehicle Body Velocity Next, a description will be given of calibration of the sensitivity coefficient A and the offset coefficient B.

Figure 7A:
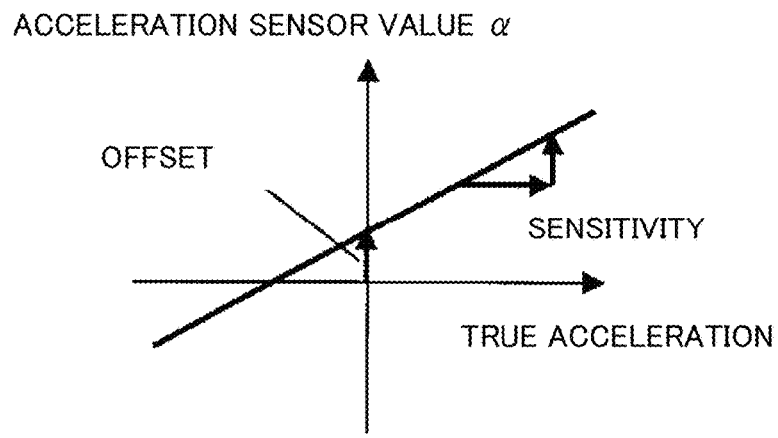
FIG. 7A is a graph indicative of the relation between the true acceleration that corresponds to the horizontal axis and the acceleration sensor value that corresponds to the vertical axis.
Figure 7B:
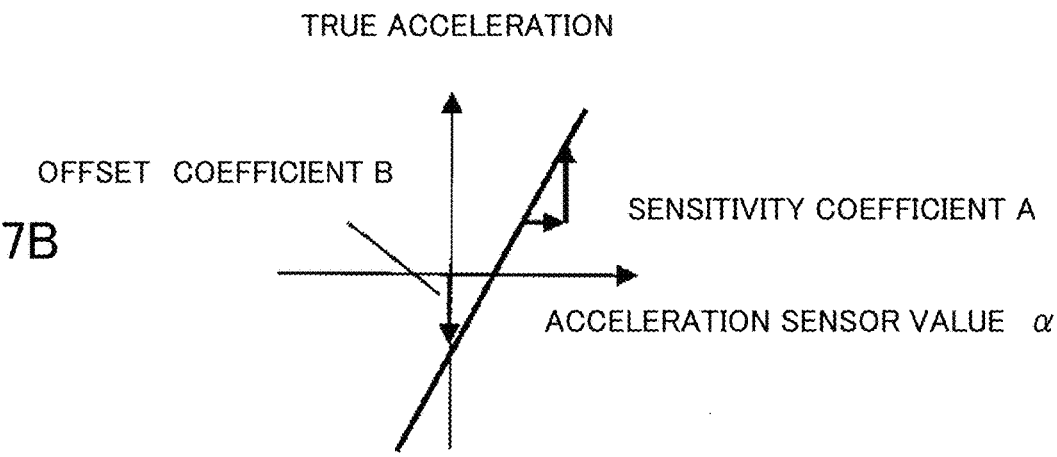
FIG. 7B is a graph indicative of the relation between the true acceleration that corresponds to the vertical axis and the acceleration sensor value that corresponds to the horizontal axis.

FIG. 7A is a graph indicative of the relation between the true acceleration that corresponds to the horizontal axis and the acceleration sensor value α that corresponds to the vertical axis. Since the linearity of the acceleration sensor is generally high as illustrated in FIG. 7A, the relation between the true acceleration and the acceleration sensor value α is substantially expressed by a linear expression. Generally, the change in the sensitivity and the offset is mainly caused by the temperature variation and if the measurement time interval δt is sufficiently short, the temperature variation which occurs in the measurement time interval δt is small enough to ignore. Thus, according to the embodiment, the measurement time interval δt is set to a sufficiently short period of time and the sensitivity and the offset at the time t−1 are regarded to be identical to the sensitivity and the offset at the time t, respectively. FIG. 7B illustrates the graph in which the horizontal axis and the vertical axis are exchanged. In FIG. 7B, the slope of the graph corresponds to the sensitivity coefficient A which indicates the ratio of the change in the true acceleration relative to the change in the acceleration sensor value α and the intercept of the graph corresponds to the offset coefficient B which indicates the true acceleration at the time when the acceleration sensor value α is 0. The sensitivity corresponding to the slope of the graph in FIG. 7A is expressed as "1/A" by use of the sensitivity coefficient A. The offset corresponding to the intercept of the graph is expressed as "−B/A" by use of the sensitivity coefficient A and the offset coefficient B. When the sensitivity and the offset at the time t−1 are identical to the sensitivity and the offset at the time t, respectively, the sensitivity coefficient A and the offset coefficient B at the time t−1 are also identical to the sensitivity coefficient A and the offset coefficient B at the time t, respectively. Thus, when the measurement time interval δt is set to a sufficiently short period of time, the true acceleration at the time t−1 is expressed by using the acceleration sensor value α [t−1] at the time t−1, the sensitivity coefficient A and the offset coefficient B as follows.

$$A\alpha[t-1]+B$$

In this case, the true acceleration at the time t is expressed as follows.

$$A\alpha[t]+B$$

Figure 7C:
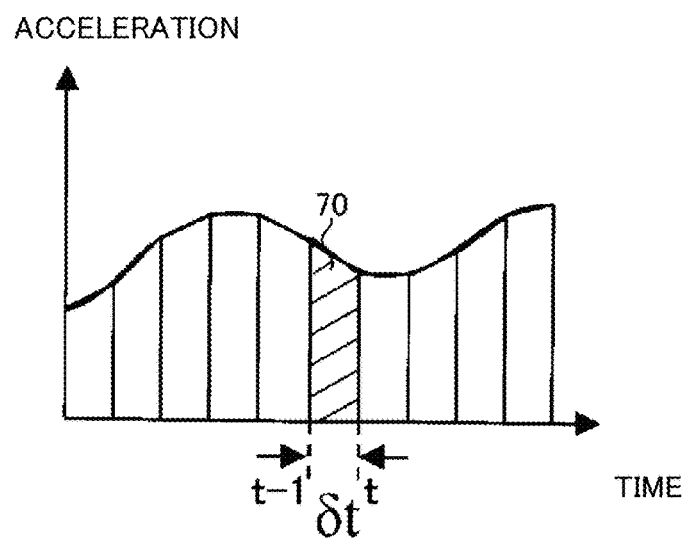
FIG. 7C illustrates the trapezoidal approximation for calculating the velocity based on the acceleration sensor value acquired at time intervals while illustrating the time variation of the true acceleration.

FIG. 7C illustrates the trapezoidal approximation for calculating the velocity based on the acceleration sensor value α acquired at the measurement time interval δt while illustrating the time variation of the true acceleration. In this example, the area of the trapezoid 70 sandwiched between the time t and the time t−1 is regarded as the increase/decrease of the vehicle body velocity in the time period between the time t−1 and the time t. In this case, the measured vehicle body velocity $V_L$ [t] at the time t is expressed as the following equation (10).

$$V_L[t] = V_L[t-1] + \frac{1}{2}(A\alpha[t-1] + B + A\alpha[t] + B)\delta t \quad (10)$$

Furthermore, as a modification of the equation (10), the following equation (11) can be obtained.

$$\frac{V_L[t] - V_L[t-1]}{\delta t} = A\frac{\alpha[t-1] + \alpha[t]}{2} + B \quad (11)$$

Here, "x[t]" is defined by the following equation (12) and the "y[t]" is defined by the following equation (13).

$$x[t] = \frac{\alpha[t-1] + \alpha[t]}{2} \quad (12)$$

$$y[t] = \frac{V_L[t] - V_L[t-1]}{\delta t} \quad (13)$$

In this case, the equation (11) is expressed by the following equation (14).

$$y[t] = Ax[t] + B \quad (14)$$

Since the equation (14) is a linear expression, it is possible to calculate the sensitivity coefficient A and the offset coefficient B with multiple pairs of x[t] and y[t].

In response to the above consideration, in the time period when the measured vehicle body velocity $V_L$ can be calculated, the controller 15 calculates multiple pairs of x[t] and y[t] based on the measured vehicle body velocity $V_L$, the acceleration sensor value α and the measurement time interval δt. Then, by using a predetermined number of latest pairs of x[t] and y[t], the controller 15 calculates the sensitivity coefficient A. and the offset coefficient B in the equation (14) through a regression analysis such as an iterative least squares technique. An approach for updating the AB table $T_{AB}$ based on the calculated sensitivity coefficient A and offset coefficient B will be explained in the section "(4) Table Update Process".

If the sensitivity coefficient A and the offset coefficient B are acquired, the true acceleration at time t−1 can be calculated according to the equation "Aα[t−1]+B" and the true acceleration at the time t can be calculated according to the equation "Aα[t]+B". Thus, on the basis of substantially the same trapezoidal approximation used in the derivation of the equation (10), the controller 15 can calculate the acceleration-based vehicle body velocity $V_\alpha$ according to the equation (2) that is the approximate expression by using the estimated vehicle body velocity $V_E$ at the previous time.

It is noted that data (x[t−s], y[t−s]) to (x[t], y[t]) acquired during s seconds from the time t−s to the time t is used as pairs of x and y in calculating the iterative least squares method. In this case, if the acceleration sensor has a large temperature coefficient (i.e., the degree of influence caused by the temperature variation is large), the sensitivity coefficient A and the offset coefficient B thereof also tend to vary. Thus, it is preferable the above "s" is set to a small value.

(4) Table Update Process

First, a description will be given of the update process of the K table $T_K$.

If the controller 15 can calculate the measured vehicle body velocity $V_L$, the controller 15 calculates the conversion coefficient K according to the above equation (9) by using the iterative least squares method. Thereafter, with reference to the K table $T_K$, the controller 15 determines whether or not the conversion coefficient $K_{i,j,h}$ and the recording time $t_K$ corresponding to the index value (i, j, h) indicative of the nearest values to the current wheel rotating speed ω, the acceleration sensor value α and the gradient angle θ based on the output of the sensor group 11 are already recorded in the K table $T_K$. Then, if the above-mentioned conversion coefficient $K_{i,j,h}$ and recording time $t_K$ are already recorded, the controller 15 acquires the conversion coefficient $K_{i, j, h}$ and the recording time $t_K$ and regards them as "$K_0$" and "$t_{K0}$", respectively. Then, in this case, by using a predetermined value "$m_K$" and the time difference $\Delta t_K$ (i.e., $t-t_{K0}$) between the current time t and the recording time $t_{K0}$, the controller 15 updates the conversion coefficient $K_{i, j, h}$ corresponding to the index value (i, j, h) according to the following equation (15).

$$K_{i,j,h} = \frac{m_K}{\Delta t_K + m_K} K_0 + \frac{\Delta t}{\Delta t_K + m_K} K \quad (15)$$

According to equation (15), with increasing value $m_K$, the weight on the past data (i.e., $K_0$) increases and therefore the weight on the latest data (i.e., K) decreases. The value $m_K$ may be a fixed value or a variable value which varies depending on the running environment (e.g., road surface condition and/or weather condition). It is noted that if the conversion coefficient $K_{i, j, h}$ and the recording time $t_K$ are not recorded yet, the controller 15 records the calculated conversion coefficient K and the current time t in the K table $T_K$ as the conversion coefficient $K_{i,j,h}$ and the recording time $t_K$.

Next, a description will be given of the update process of the AB table $T_{AB}$.

First, the controller 15 calculates the sensitivity coefficient A and the offset coefficient B based on the above-mentioned equations (12) to (14). Thereafter, with reference to the AB table $T_{AB}$, the controller 15 determines whether or not the sensitivity coefficient $A_n$, offset coefficient $B_n$ and the recording time $t_{AB}$ corresponding to the index value (n) having the nearest value to the current temperature T outputted by the temperature sensor 26 are already recorded in the AB table $T_{AB}$. Then, if the sensitivity coefficient $A_n$, offset coefficient $B_n$ and the recording time $t_{AB}$ are already recorded, the controller 15 acquires the sensitivity coefficient $A_n$, offset coefficient $B_n$ and the recording time $t_{AB}$ and regards them as "$A_0$", "$B_0$" and "$t_{AB0}$", respectively. Then, in this case, by using a predetermined value "$m_{AB}$" and the time difference $\Delta t_{AB}$ (i.e., $t-t_{AB0}$) between the current time t and the recording time $t_{AB0}$, the controller 15 updates the sensitivity coefficient $A_n$ and offset coefficient $B_n$ corresponding to the index value (n) according to the following equations (16) and (17).

$$A_n = \frac{m_{AB}}{\Delta t_{AB} + m_{AB}} A_0 + \frac{\Delta t_{AB}}{\Delta t_{AB} + m_{AB}} A \quad (16)$$

$$B_n = \frac{m_{AB}}{\Delta t_{AB} + m_{AB}} B_0 + \frac{\Delta t_{AB}}{\Delta t_{AB} + m_{AB}} B \quad (17)$$

With increasing value $m_{AB}$, the weight on the past data (i.e., $A_0$ and $B_0$) increases and therefore the weight on the latest data (i.e., A and B) decreases. The value $m_{AB}$ may be a fixed value or a variable value which varies depending on the running environment.

Above-mentioned equations (15) to (17) indicate the weighted averaging process of the past data and the latest data. Thus, even if the latest data has noises, the degree of the influence caused thereby becomes low. The equations (15) to (17) also indicate that old data whose time length between the generated time and the current time is long has a low weight, which corresponds to the situation that updated data moderately varies.

It is noted that in cases that the temperature coefficient of the acceleration sensor to be used varies depending on the sensitivity or the offset, the predetermined value $m_{AB}$ used in calculating the sensitivity coefficient $A_n$ may be different from the predetermined value $m_{AB}$ used in calculating the offset coefficient $B_n$.

Figure 8:
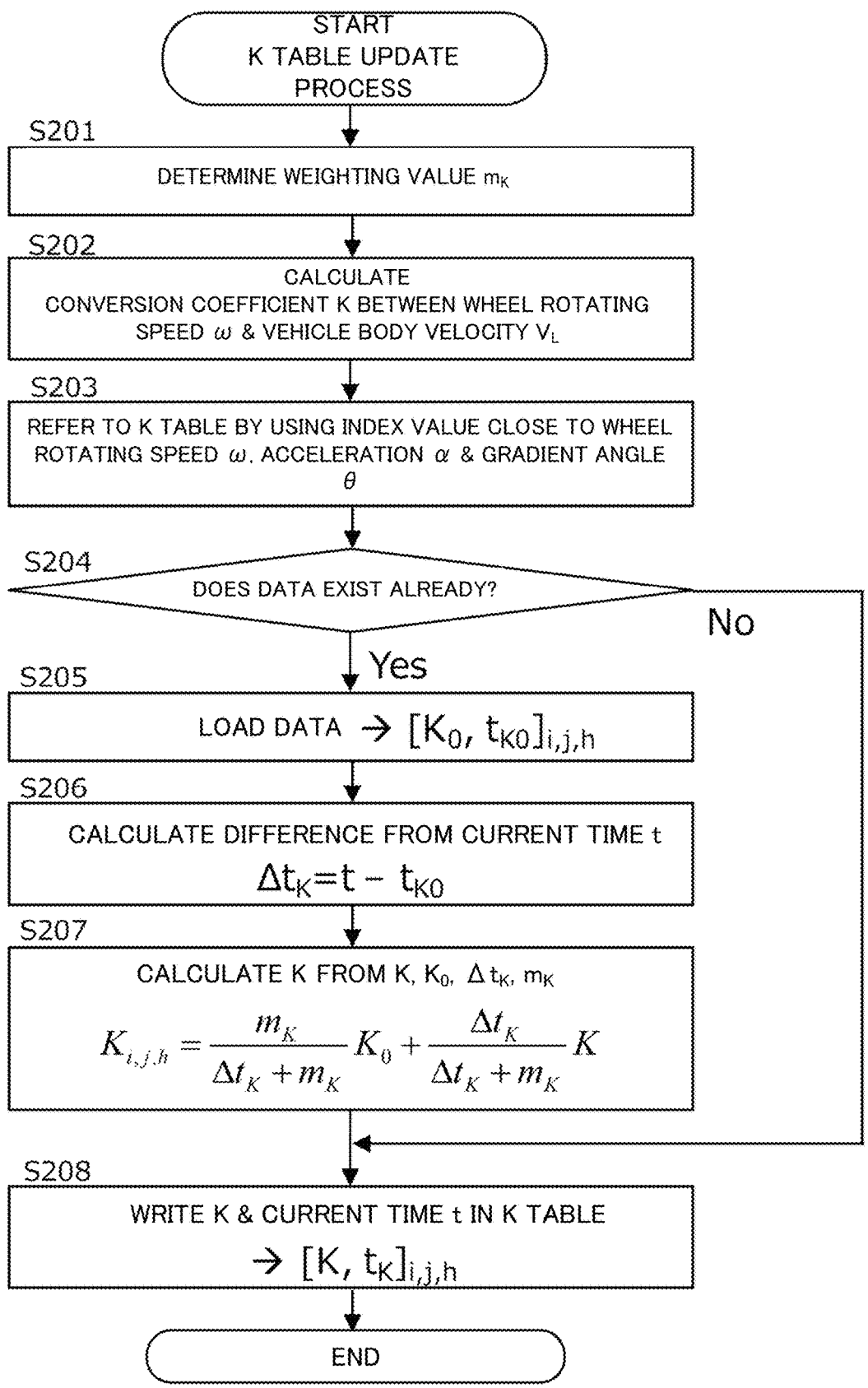
FIG. 8 is a flowchart of K table update process.

FIG. 8 is a flowchart indicative of the procedure of the update process of the K table $T_K$ executed by the controller 15 at step S104 in FIG. 4.

First, the controller 15 determines the predetermined value $m_K$ to be used in the weighted averaging process according to the equation (15) (step S201). The controller 15 may regard a value stored in advance as the value $m_K$ or may regard, as the value $m_K$, a value in accordance with the running environment (e.g., road surface condition and weather condition) recognized from the output of the sensor group 11 with reference to a predetermined equation or a map.

Next, on the basis of the above-mentioned equation (9), the controller 15 calculates the conversion coefficient K between the wheel rotating speed ω and the measured vehicle body velocity $V_L$ (step S202). Then, the controller 15 refers to K table $T_K$ based on the index value (i, j, h) indicative of the nearest values to the wheel rotating speed ω, the acceleration sensor value α and the gradient angle θ detected at step S101 (step S203). Then, the controller 15 determines whether or not there exists data at the index value (i, j, h) in the K table $T_K$ already (step S204).

Then, if there exists data at the index value (i, j, h) in the K table $T_K$ already (step S204; Yes), the controller 15 loads (retrieves) the conversion coefficient $K_{i,j,h}$ and the recording time $t_K$ at the index value (i, j, h) from the K table $T_K$ and regards them as "$K_0$" and "$t_{K0}$", respectively (step S205). Then, the controller 15 calculates the time difference $\Delta t_K$ between the current time t and the recording time $t_{K0}$ (step S206). Then, on the basis of the conversion coefficient K calculated at step S202, the conversion coefficient $K_0$ retrieved at step S205, the time difference $\Delta t_K$ calculated at step S206 and the value $m_K$ determined at step S201, the controller 15 calculates conversion coefficient $K_{i, j, h}$ to be recorded at the index value (i, j, h) according to the equation (15) (step S207). Then, the controller 15 writes (saves) the conversion coefficient $K_{i, j, h}$ calculated at step S207 and the recording time $t_K$ which corresponds to the current time over the data at the index value (i, j, h) in the K table $T_K$ (step S208).

In contrast, at step S204, if there exists no data at the index value (i, j, h) in the K table $T_K$ (step S204; No), the controller 15 writes (saves) the conversion coefficient K calculated at step S202 and the current time $t_K$ which corresponds to the current time at the index value (i, j, h) in the K table $T_K$ (step S208).

Figure 9:
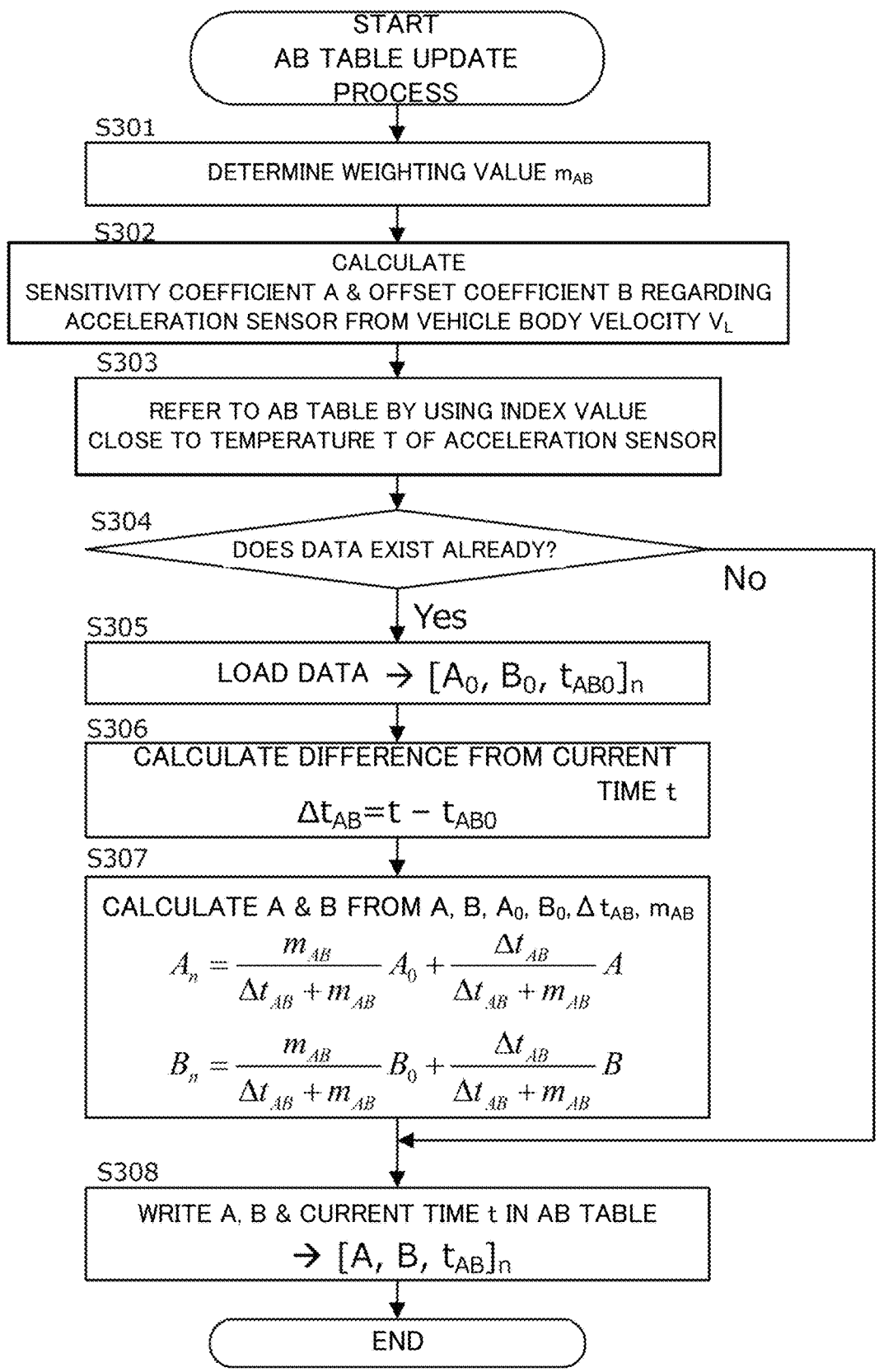
FIG. 9 is a flowchart of AB table update process.

FIG. 9 is a flowchart indicative of the procedure of the update process of the AB table $T_{AB}$ executed by the controller 15 at step S105 in FIG. 4.

First, the controller 15 determines the value $m_{AB}$ used in the weighted averaging process according to the equations (16) and (17) (step S301). The controller 15 may regard a value stored in advance as the value $m_{AB}$ or may regard, as the value $m_{AB}$, a value in accordance with the running environment (e.g., road surface condition and weather condition) recognized from the output of the sensor group 11 with reference to a predetermined equation or a map.

Next, according to the equations (12) to (14), the controller 15 calculates the sensitivity coefficient A and the offset coefficient B by using the measured vehicle body velocity $V_L$ (step S302). Then, the controller 15 refers to the AB table $T_{AB}$ based on the index value (n) which indicates the nearest temperature to the temperature T detected at step S101 (step S303). Then, the controller 15 determines whether or not there exists data at the index value (n) in the AB table $T_{AB}$ already (step S304).

If there exists data at the index value (n) in the AB table $T_{AB}$ already (step S304; Yes), the controller 15 loads sensitivity coefficient $A_n$, the offset coefficient $B_n$ and the recording time $t_{AB}$ at the index value (n) in the AB table $T_{AB}$ and regards them as "$A_0$", "$B_0$" and "$t_{AB0}$", respectively (step S305). Then, the controller 15 calculates the time difference $\Delta t_{AB}$ between the current time t and the recording time $t_{AB0}$ (step S306). Then, on the basis of the sensitivity coefficient A and the offset coefficient B calculated at step S302, the sensitivity coefficient $A_0$ and offset coefficient $B_0$ loaded at step S305, the time difference $\Delta t_{AB}$ calculated at step S306 and the value $m_{AB}$ determined at step S301, the controller 15 calculates sensitivity coefficient $A_n$ and offset coefficient $B_n$ to be recorded at the index value (n) according to the equations (16) and (17) (step S307). Then, the controller 15 writes (saves) the sensitivity coefficient $A_n$ and offset coefficient $B_n$ calculated at step S307 and recording time $t_{AB}$ which corresponds to the current time over the data at the index value (n) in the AB table $T_{AB}$ (step S308).

In contrast, at step S304, if there is no data at the index value (n) in the AB table $T_{AB}$ (step S304; No), the controller 15 writes (saves) the sensitivity coefficient A and offset coefficient B calculated at step S302 and the current time t at the index value (n) in the AB table $T_{AB}$ as the sensitivity coefficient $A_n$, offset coefficient $B_n$ and the recording time $t_{AB}$ (step S308).

In the above explanation, the acceleration sensor value $\alpha$ is used as the acceleration that is one of the indexes in the K table $T_K$. Instead, a value converted into the true acceleration by use of the sensitivity coefficient A and the offset coefficient B retrieved from the AB table $T_{AB}$ may be used. In cases that such an acceleration sensor with a large temperature coefficient is used, using the value converted into the true acceleration can reduce the error of the index value itself, thus suitably raising the degree of accuracy.

(5) Determination on Possibility of Measuring Vehicle Body Velocity by LIDAR

Next, a description will be given of the specific examples of an approach for determining the possibility of measuring the vehicle body velocity by the LIDAR 21 at step S102 in FIG. 4.

For example, with reference to the map DB 10, the controller 15 determines whether or not there is a landmark needed to measure the vehicle body velocity by the LIDAR 21. Namely, the controller 15 determines whether or not there is registered in the map DB 10 a landmark associated with a position within the measurable range by the LIDAR 21. In this case, for example, in the map DB 10, position information on landmarks to be used in measuring the vehicle body velocity by the LIDAR 21 is associated with information (e.g., shape information) needed to identify each of the landmarks.

Then, in cases that there is no landmark in the map DB 10 associated with a position within the measurable range by the LIDAR 21, the controller 15 determines that the vehicle body velocity cannot be measured by the LIDAR 21 and proceeds with the process at step S106.

In this case, first, on the basis of the estimated or measured position, the orientation of the travelling direction, the measurable distance by the LIDAR 21 and the range of the scan angle of the laser with respect to the travelling direction which are preliminarily stored, the controller 15 specifies the measurable range by the LIDAR 21. Then, the controller 15 determines whether or not there is any landmark in the map DB 10 associated with a position within the measurable range by the LIDAR 21. Then, if there is no landmark in the map DB 10 associated with a position within the measurable range by the LIDAR 21, the controller 15 determines that the vehicle body velocity cannot be measured by the LIDAR 21.

Even if the controller 15 determines that there is any landmark in the map DB 10 associated with a position within the measurable range by the LIDAR 21, the controller 15 thereafter could determine that the landmark does not actually exist. In this case, the controller 15 determines that the vehicle body velocity cannot be measured by the LIDAR 21.

In this case, for example, with reference to the map DB 10, the controller 15 specifies the position and shape of the landmark(s) situated within the measurable range by the LIDAR 21. Then, the controller 15 determines whether or not the position and the shape of the landmark specified by the map DB 10 is identical to the position and the shape constituted by the point cloud outputted by the LIDAR 21. Then, if there is no point cloud indicative of the position and the shape similar to the position and the shape of the landmark specified by the map DB 10, the controller 15 determines that the landmark does not exist and that the vehicle body velocity cannot be measured by the LIDAR 21.

According to these examples, the controller 15 can correctly determine the possibility of measuring the vehicle body velocity by the LIDAR 21 at step S102 in FIG. 4.

[Supplemental Explanation of Effect]

Next, a supplemental explanation will be given of the effect according to the embodiment.

In cases that the controller 15 determines that the measured vehicle body velocity $V_L$ cannot be calculated, the controller 15 extracts the conversion coefficient K corresponding to the current running state (the wheel rotating speed $\omega$, the acceleration sensor value $\alpha$, the gradient angle $\theta$) from the K table $T_K$ to use the conversion coefficient K for calculating the axle pulse-based vehicle body velocity $V_p$ while extracting the sensitivity coefficient A and the offset coefficient B corresponding to the current temperature environment (temperature T) from the AB table $T_{AB}$ to use them for calculating the acceleration-based vehicle body velocity $V_\alpha$. Thereby, for example, even if such a state that the vehicle body velocity cannot be measured by the LIDAR 21 continues and therefore the difference (including time difference, temperature difference and gradient difference) with respect to the last time of executing the calibration of the conversion coefficient K, sensitivity coefficient A and the offset coefficient B becomes large, the controller 15 can retrieve from the tables the probable conversion coefficient K, sensitivity coefficient A and offset coefficient B that are associated with the conditions substantially equivalent to the current running state and current temperature environment in the tables, thereby accurately calculating the vehicle body velocity.

For example, such a situation is herein assumed that the engine is stopped for a long time after travelling on outdoor roads and entering an indoor parking lot and that the engine is restarted to travel. It is also assumed that the parking lot does not have any landmark to be used for measuring the velocity by the LIDAR 21. In this case, there is an air resistance because of the vehicle being in normal driving until the vehicle enters the parking lot. However, since the vehicle travels at a low speed inside the parking lot, the air resistance is small. Thus, in this case, the conversion coefficient K before entering the parking lot could be different from the conversion coefficient K after entering the parking lot. Generally, though the temperature of the acceleration sensor 23 during driving the vehicle is in a little high temperature state (several dozen degrees C.), the temperature of the acceleration sensor 23 becomes low at the time when a long time has passed after the stop of the engine. Thus, in this case, the sensitivity coefficient A and the offset coefficient B before the stop of the engine could be different from the sensitivity coefficient A and the offset coefficient B after the stop of the engine. In this way, even in such a situation that the conversion coefficient K, the sensitivity coefficient A and the offset coefficient B vary rapidly, the controller 15 according to the embodiment refers to the K table $T_K$ and the AB table $T_{AB}$ and extracts the conversion coefficient K, the sensitivity coefficient A and the offset coefficient B calibrated in conditions similar to the current running state and the current temperature environment, thus estimating the vehicle body velocity accurately.

It is noted that since in an indoor parking lot, the GPS receiver 27 generally cannot receive the electrical waves, the performance of the dead reckoning (relative self-position estimation) is important for the estimation of the own vehicle position. Thus, by accurately calculating the vehicle body velocity according to the embodiment, it is possible to suitably raise the accuracy of the self-position estimate by dead reckoning.

Next, a supplemental explanation will be given of the effect by the calculation method of the estimated vehicle body velocity $V_E$ based on the weighted averaging of the axle pulse-based vehicle body velocity $V_p$ and the acceleration-based vehicle body velocity $V_\alpha$ according to the equation (3). Generally, if the change in the air pressure of a tire or the friction of the tires occurs, the radius of the tire varies and therefore the conversion coefficient K also varies. Thus, the later the recording time $t_K$ is, the higher the degree of the reliability of the conversion coefficient K retrieved and used from the K table $T_K$ becomes. For high-performance acceleration sensors, the sensitivity coefficient A and the offset coefficient B remain substantially unchanged on the condition that the temperature remains unchanged and therefore their reproducibility is high. In contrast, for normal price acceleration sensors, the reproducibility is low. Thus, the later the recording time $t_{AB}$ is, the higher the degree of the reliability of the sensitivity coefficient A and the offset coefficient B retrieved and used from the AB table $T_{AB}$ becomes.

In response to the above consideration, according to the embodiment, it calculates the time difference $\Delta t_K$ between the recording time $t_K$ and the current time t and the time difference $\Delta t_{AB}$ between the recording time $t_{AB}$ and the current time t and calculates the estimated vehicle body velocity $V_E$ through the weighted averaging process between the axle pulse-based vehicle body velocity $V_p$ and the acceleration-based vehicle body velocity $V_\alpha$ according to the equation (3). According to the above method, it is possible to put a larger weight on the axle pulse-based vehicle body velocity $V_p$ or the acceleration-based vehicle body velocity $V_\alpha$, whichever has the higher reliability, thereby to raise the accuracy of the estimated vehicle body velocity $V_E$.

Modifications

Next, a description will be given of preferred modifications of the embodiment. The following modifications may be applied to the above embodiment in any combination.

First Modification

The controller 15 may multiply each time difference $\Delta t_K$ and time difference $\Delta t_{AB}$ for determining the weights on the acceleration-based vehicle body velocity $V_\alpha$ and the axle pulse-based vehicle body velocity $V_p$ according to the equation (3) by a predetermined coefficient. Namely, the controller 15 determines a coefficient "$w_K$" for the time difference $\Delta t_K$ and a coefficient "$w_{AB}$" for the time difference $\Delta t_{AB}$ and then calculates the estimated vehicle body velocity $V_E$ according to the following equation (18).

$$V_E[t] = \frac{w_{AB}\Delta t_{AB}}{w_k \Delta t_K + w_{AB}\Delta t_{AB}} V_p[t] + \frac{w_k \Delta t_K}{w_k \Delta t_K + w_{AB}\Delta t_{AB}} V_\alpha[t] \quad (18)$$

By using the equation (18), the controller 15 can correctly deal with such a situation that degree of the influence on the acceleration-based vehicle body velocity $V_\alpha$ by the temperature variation of the acceleration sensor 23 is different from the degree of the influence on the axle pulse-based vehicle body velocity $V_p$ by the acceleration variation and the gradient angle variation of the vehicle. Thereby, the controller 15 can correctly determine each weight on the acceleration-based vehicle body velocity $V_\alpha$ and the axle pulse-based vehicle body velocity $V_p$.

A description will be given of examples of determining the coefficient $w_K$ and the coefficient $w_{AB}$.

For example, the controller 15 determines that as the change in the sensitivity coefficient A and the offset coefficient B of the acceleration sensor 23 in response to the temperature variation becomes great, the influence by the temperature variation becomes large and the coefficient $w_{AB}$ should be large.

In another example, the controller 15 determines a larger coefficient $w_K$ in cases the controller 15 determines that the road surface where the vehicle is travelling is in a slippery condition than the coefficient $w_K$ determined in cases that the road surface is not in a slippery condition. According to the state equations (4) to (8) and FIGS. 6A and 6B, in cases that the road surface is in a slippery condition such as a moist road surface and a frozen road surface, the variation of the slip ratio $\lambda$ in response to variation of the friction coefficient $\mu$ becomes large. Thus, in this case, even if the change in the driving force $F_d$ due to the acceleration/deceleration or the increase/decrease of the running resistance is the same, the slip ratio $\lambda$ for obtaining a necessary friction coefficient $\mu$ becomes large. Namely, in this case, the relation between the vehicle body velocity and the wheel rotating speed greatly changes. In this case, the calculation value of the vehicle body velocity by use of the conversion coefficient K is likely to have the error. In response to the above consideration, at the time of determining that the road surface is in a slippery condition, the controller 15 determines a large coefficient $w_K$. For example, the controller 15 determines that the road surface is in a slippery condition at the time of: detecting a raindrop through a raindrop sensor; recognizing, on the basis of weather information received from a server device, that it is raining or snowing; or recognizing, on the basis of road surface information recorded in the map DB 10, that the road surface where the vehicle is travelling is slippery.

In still another example, the controller 15 increases the coefficient $w_K$ with increasing vehicle body weight M. Generally, the heavier the vehicle body weight M is, the larger the running resistance $F_{dr}$ due to the road gradient becomes. Thus, it is necessary to increase the driving force $F_{dr}$ with increasing vehicle body weight M in order to travel at the same seed. Thus, in this case, since the slip ratio $\lambda$ becomes large in order to enlarge the friction coefficient $\mu$, the difference between the vehicle body velocity and the wheel rotating speed consequently becomes large. Thus, in this case, the vehicle body velocity calculated by use of the stored conversion coefficient K is likely to have an error. In response to the above consideration, the controller 15 increases the coefficient $w_K$ with increasing vehicle body weight M. For example, the controller 15 increases the coefficient $w_K$ in accordance with the increase of the number of passengers detected based on the output of a sensor which detects absence/presence of passengers on the seats. In this case, preferably, the controller 15 increases the initial value of the coefficient $w_K$ determined in case of 0 passenger as the basis weight of the vehicle increases.

Second Modification

The approach for calculating the acceleration-based vehicle body velocity $V_\alpha$ is not limited to the calculating method based on the trapezoid approximation illustrated in FIG. 7C according to the equation (2). Instead, the approach for calculating the acceleration-based vehicle body velocity $V_\alpha$ may be the calculating method based on rectangular (reed shape) approximation. Hereinafter, a description will be given of an approach for calculating the acceleration-based vehicle body velocity $V_\alpha$ based on rectangular (reed shape) approximation.

Figure 10:
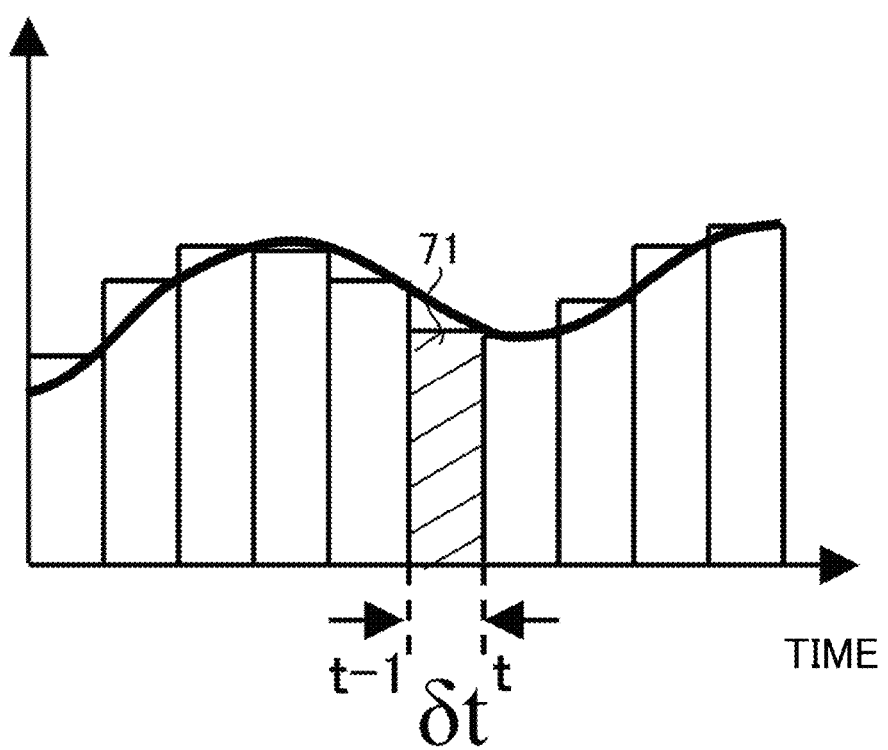
FIG. 10 illustrates the time variation of the true acceleration and the rectangular approximation for calculating the velocity based on the acceleration sensor value obtained at time intervals.

FIG. 10 illustrates the time variation of the true acceleration and the rectangular approximation for calculating the velocity based on the acceleration sensor value $\alpha$ obtained at the measurement time interval $\delta t$. It is noted that the true acceleration at the time t can be expressed by "$A\alpha[t]+B$" as with the embodiment.

According to FIG. 10, the increase/decrease of the vehicle body velocity during a period from the time t−1 to the time t is regarded as the area of the rectangular field 71 whose long side is the true acceleration ($A\alpha[t]+B$) at the time t and whose short side is the measurement time interval $\delta t$. In this case, the measured vehicle body velocity $V_L$ is expressed by the following equation (19).

$$V_L[t]=V_L[t-1]+(A\alpha[t]+B)\delta t \tag{19}$$

Furthermore, the following equation (20) can be obtained as a modification of the equation (19).

$$\frac{V_L[t]-V_L[t-1]}{\delta t}=A\alpha[t]+B \tag{20}$$

Here, as indicated by the following equation (21), the left side of the equation (20) is substituted by "y[t]" and as indicated by the following equation (22), the right side that is the acceleration sensor value a[t] is substituted by "x[t]".

$$y[t]=\frac{V_L[t]-V_L[t-1]}{\delta t} \tag{21}$$

$$x[t]=\alpha[t] \tag{22}$$

In this case, the equation (20) can be expressed as follows.

$$y[t]=Ax[t]+B$$

Since the equation is a linear expression, it is possible to calculate the sensitivity coefficient A and the offset coefficient B by using multiple pairs of x[t] and y[t].

Thus, during such a time period that the measured vehicle body velocity $V_L$ can be calculated, the controller 15 calculates the measured vehicle body velocity $V_L$ based on the previously-measured vehicle body velocity $V_L$, the acceleration sensor value $\alpha$ and measurement time interval $\delta t$ and then calculates pairs of x[t] and y[t] by using the measured vehicle body velocity $V_L[t]$, $V_L[t-1]$, the measurement time interval $\delta t$ and the acceleration sensor value $\alpha$ [t]. Thereafter, on the basis of the regression analysis such as an iterative least squares method with a predetermined number of latest pairs of x[t] and y [t], the controller 15 calculates the sensitivity coefficient A and the offset coefficient B which correspond to the slope and the intercept of a linear expression, respectively.

When the sensitivity coefficient A and the offset coefficient B are obtained, the true acceleration at the time t can be calculated by the equation "$A\alpha[t]+B$". Thus, by using the estimated vehicle body velocity $V_E$ at the last time, the controller 15 can calculate the acceleration-based vehicle body velocity $V_\alpha$ according to the equation (23) that is an approximate expression.

$$V_\alpha[t]=V_E[t-1]+(A\alpha[t]+B)\delta t \tag{23}$$

In this way, according to this modification, the controller 15 can also calculate the acceleration-based vehicle body velocity $V_\alpha$ based on the rectangular approximation while calculating the sensitivity coefficient A and the offset coefficient B.

Third Modification

According to the above embodiment, the controller 15 preferentially determines the measured vehicle body velocity $V_L$ as the estimated vehicle body velocity $V_E$, wherein the measured vehicle body velocity $V_L$ is a vehicle body velocity based on the output of the LIDAR 21 for calculating a vehicle body velocity with a high degree of accuracy. However, the calculation method of a vehicle body velocity with a high degree of accuracy to which the present invention can be applied is not limited to the method based on the output of the LIDAR 21.

For example, the controller 15 may preferentially determine the vehicle body velocity calculated based on an optical road surface sensor as the estimated vehicle body velocity $V_E$. For example, Patent Reference-2 shown as a prior art discloses an approach for calculating the vehicle body velocity based on an optical road surface sensor. In this case, when the vehicle body velocity can be calculated based on an optical road surface sensor, the controller 15 determines the vehicle body velocity based on the optical road surface sensor as the estimated vehicle body velocity $V_E$. In contrast, when the vehicle body velocity cannot be calculated based on the optical road surface sensor, the controller 15 calculates the estimated vehicle body velocity $V_E$ according to the equation (3) with the axle pulse-based vehicle body velocity $V_p$ and the acceleration-based vehicle body velocity $V_\alpha$. In this case, for example, on the basis of the condition of the road surface where the vehicle is travelling, the controller 15 determines whether or not the vehicle body velocity can be calculated based on the optical road surface sensor. For example, at the time of detecting a vibration having a range larger than a predetermined width through the output of a vibration sensor, the controller 15 determines that the road surface is in a bad condition and therefore determines that the vehicle body velocity based on the optical road surface sensor cannot be calculated. In another example, if the controller 15 determines, with reference to the road data in the map DB 10, that the road where the vehicle is travelling is not paved, the controller 15 determines that the vehicle body velocity based on the road surface sensor cannot be calculated. In still another example, the controller 15 may determines the condition of the road surface by analyzing image (s) of a camera which captures the road surface. In this way, the approach for calculating the vehicle body velocity preferentially determined as the estimated vehicle body velocity $V_E$ is not limited to the approach with the output of the LIDAR 21.

Fourth Modification

The controller 15 may generate the conversion coefficient K, the sensitivity coefficient A and the offset coefficient B corresponding to the index value having no recorded data in the K table $T_K$ and the AB table $T_{AB}$ through an interpolation algorithm.

In this case, for example, after the execution of the update process of the K table $T_K$ at step S208 illustrated in FIG. 8, on the basis of the values of the conversion coefficient K corresponding to the index values which already have recorded data, the controller 15 calculates the values of the conversion coefficient K corresponding to the index values which have no recorded data through an interpolation algorithm such as a linear interpolation and a spline interpolation. It is noted that, for the purpose of the discrimination from the data recorded at step S208, the controller 15 may not record the recording time $t_K$ corresponding to the index value whose conversion coefficient K is calculated through an interpolation algorithm, for example. In this case, regarding the update process of the K table $T_K$ thereafter, at the time of determining, at step S204, that the recording time $t_K$ is not recorded at the corresponding index value, the controller 15 records, without performing the averaging process at step S205 to S207, the conversion coefficient K calculated at step S202 and the recording time $t_K$ corresponding to the current time t at step S208 in a state of being associated with the target index value.

In the same way, after the execution of the update process of the AB table $T_{AB}$ at step S308 illustrated in FIG. 9, on the basis of the values of the sensitivity coefficient A. and the offset coefficient B corresponding to the index values which already have recorded data, the controller 15 calculates the values of the sensitivity coefficient A and the offset coefficient B corresponding to the index values which have no recorded data through an interpolation algorithm.

According to this modification, even if the controller 15 refers to an index value having no recorded data in the K table $T_K$ or the AB table $T_{AB}$, the controller 15 can suitably calculate the axle pulse-based vehicle body velocity $V_p$ or the acceleration-based vehicle body velocity $V_\alpha$ by using the values calculated through the interpolation.

Fifth Modification

As to the flowchart illustrated in FIG. 4, in cases that the measured vehicle body velocity $V_L$ cannot be calculated, the controller 15 calculates both of the axle pulse-based vehicle body velocity $V_p$ and the acceleration-based vehicle body velocity $V_\alpha$ thereby to calculate the estimated vehicle body velocity $V_E$ through the weighted averaging process according to the equation (3). Instead, in cases that the measured vehicle body velocity $V_L$ cannot be calculated, the controller 15 may calculate either one of the axle pulse-based vehicle body velocity $V_p$ or the acceleration-based vehicle body velocity $V_\alpha$ thereafter to determine the calculated axle pulse-based vehicle body velocity $V_p$ or acceleration-based vehicle body velocity $V_\alpha$ as the estimated vehicle body velocity $V_E$. In this case, the storage unit 12 may store only K table $T_K$ or AB table $T_{AB}$.

Sixth Modification

As to the update process of the K table $T_K$ illustrated in FIG. 8, at the time of determining, at step S204, that there is data at the target index value, the controller 15 performs the averaging process at step S205 to step S207 thereby to calculate the update value of the conversion coefficient K. Instead, regardless of whether or not there is data at the target index value, the controller 15 may record the conversion coefficient K calculated at step S202 as the conversion coefficient K corresponding to the target index value. In the same way, as to the update process of the AB table $T_{AB}$ illustrated in FIG. 9, at the time of calculating the sensitivity coefficient A and the offset coefficient B at step S302, the controller 15 may record the sensitivity coefficient A and the offset coefficient B calculated at step S302 as the sensitivity coefficient A and the offset coefficient B corresponding to the target index value regardless of whether or not there is data at the target index value.

BRIEF DESCRIPTION OF REFERENCE NUMBERS

1 Vehicle mounted apparatus
11 Sensor group
12 Storage unit
14 Input unit
15 Controller
16 Output unit
17 Vehicle body velocity estimation unit
18 Table update unit

The invention claimed is:

1. A velocity calculation apparatus comprising:
an acquisition unit configured to acquire measured vehicle body velocity of a moving body and moving body information on the moving body, the measured vehicle body velocity being based on measurement information outputted by a measurement device which measures surroundings of the moving body;
a storage unit storing calculation values for calculating a velocity of the moving body, each of the calculation values being associated with moving body information on the moving body; and
a controller configured,
  at a time when the measured vehicle body velocity can be acquired, to determine an estimated velocity of the moving body as the measured vehicle body velocity, and
  at a time when the measured vehicle body velocity cannot be acquired, to calculate the estimated velocity based on the moving body information acquired by the acquisition unit and a corresponding calculation value that is among the calculation values, the corresponding calculation value corresponding to the moving body information acquired by the acquisition unit.

2. The velocity calculation apparatus according to claim 1,
wherein, at the time when the measured vehicle body velocity can be acquired, the controller updates, on a basis of the measured vehicle body velocity, a calculation value to be stored on the storage unit in a state of being associated with the moving body information acquired by the acquisition unit.

3. The velocity calculation apparatus according to claim 2, wherein, at the time when the measured vehicle body velocity can be acquired, the controller stores, on the storage unit in a state of being associated with the moving body information acquired by the acquisition unit, a calculation value that is an average of a calculation value calculated based on the measured vehicle body velocity and a calculation value already stored on the storage unit in a state of being associated with the moving body information acquired by the acquisition unit.

4. The velocity calculation apparatus according to claim 2, wherein, through an interpolation of calculation values corresponding to the moving body information which is associated with the calculation values, the controller calculates a calculation value to be associated with the moving body information which is not associated with a calculation value on the storage unit.

5. The velocity calculation apparatus according to claim 1, wherein the storage unit stores, as a calculation value, at least one of a first coefficient for calculating a third velocity of the moving body based on a wheel rotating speed of the moving body or a second coefficient for calculating a fourth velocity of the moving body based on an acceleration of the moving body, and wherein, at the time when the measured vehicle body velocity cannot be acquired, the controller determines the estimated velocity based on at least one of the third velocity or the fourth velocity.

6. The velocity calculation apparatus according to claim 5, wherein the acquisition unit acquires, as the moving body information, at least one of information indicative of a running state of the moving body or temperature information, wherein, in a case where the acquisition unit acquires the information indicative of the running state, the controller calculates the third velocity by retrieving a first coefficient corresponding to the running state from the storage unit, and wherein, in a case where the acquisition unit acquires the temperature information, the controller calculates the fourth velocity by retrieving a second coefficient corresponding to temperature indicated by the temperature information from the storage unit.

7. The velocity calculation apparatus according to claim 5, wherein the storage unit stores at least one of a first table or a second table, the first table indicating a first coefficient per combination of an acceleration, a gradient angle and a wheel rotating speed, the second table indicating a second coefficient per temperature.

8. The velocity calculation apparatus according to claim 5, wherein, after calculating the third velocity and the fourth velocity, the controller calculates the estimated velocity by weighting the third velocity and the fourth velocity based on a time that has elapsed since the first coefficient used for calculation of the third velocity was recorded in the storage unit and a time that has elapsed since the second coefficient used for calculation of the fourth velocity was recorded in the storage unit.

9. The velocity calculation apparatus according to claim 1, wherein the acquisition unit acquires information outputted by an external sensor as the information on surroundings of the moving body, and wherein, at a time of detecting a feature whose position information is stored on the storage unit through the information outputted by the external sensor, the controller determines that the measured vehicle body velocity can be acquired.

10. A control method executed by a velocity calculation apparatus which includes a storage unit storing calculation values for calculating a velocity of a moving body, each of the calculation values being associated with moving body information on the moving body, the control method comprising:
acquiring measured vehicle body velocity of the moving body and moving body information on the moving body, the measured vehicle body velocity being based on measurement information outputted by a measurement device which measures surroundings of the moving body;
a control process,
at a time when the measured vehicle body velocity can be acquired, determining an estimated velocity of the moving body as the measured vehicle body velocity, and
at a time when the measured vehicle body velocity cannot be acquired, calculating the estimated velocity based on the moving body information acquired by the acquisition process and a corresponding calculation value that is among the calculation values, the corresponding calculation value corresponding to the moving body information acquired by the acquisition.

11. A non-transitory computer readable medium including instructions executed by a computer of a velocity calculation apparatus which includes a storage unit storing calculation values for calculating a velocity of a moving body, each of the calculation values being associated with moving body information on the moving body, the instructions comprising:
acquiring measured vehicle body velocity of the moving body and moving body information on the moving body, the measured vehicle body velocity being based on measurement information outputted by a measurement device which measures surroundings of the moving body;
a controller configured,
at a time when the measured vehicle body velocity can be acquired, determining an estimated velocity of the moving body as the measured vehicle body velocity, and
at a time when the measured vehicle body velocity cannot be acquired, calculating the estimated velocity based on the moving body information acquired by the acquisition unit and a corresponding calculation value that is among the calculation values, the corresponding calculation value corresponding to the moving body information acquired by the acquisition.

* * * * *